(12) United States Patent
Hara et al.

(10) Patent No.: US 11,451,675 B2
(45) Date of Patent: Sep. 20, 2022

(54) IMAGE READING APPARATUS, IMAGE READING SYSTEM, IMAGE READING CONTROL METHOD AND NON-TRANSITORY COMPUTER-READABLE STORAGE MEDIUM STORING PROGRAM

(71) Applicant: SEIKO EPSON CORPORATION, Tokyo (JP)

(72) Inventors: Koji Hara, Matsumoto (JP); Tadayuki Inaoka, Matsumoto (JP); Osamu Koyama, Matsumoto (JP); Nobutaka Suzuki, Shiojiri (JP); Junpei Kurogi, Tomi (JP); Hideaki Tokuda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/215,564

(22) Filed: Mar. 29, 2021

(65) Prior Publication Data

US 2021/0306474 A1 Sep. 30, 2021

(30) Foreign Application Priority Data

Mar. 30, 2020 (JP) .............................. JP2020-059835

(51) Int. Cl.
*H04N 1/00* (2006.01)
*H04N 1/12* (2006.01)

(52) U.S. Cl.
CPC ..... *H04N 1/00209* (2013.01); *H04N 1/00005* (2013.01); *H04N 1/00013* (2013.01);

(Continued)

(58) Field of Classification Search
CPC .. G03G 15/502; G03G 15/5079; G03G 15/55; G03G 2215/00109; G06F 11/0733; G06F 11/076; G06F 11/0769; G06F 11/0781; G06F 3/1207; G06F 3/121; G06F 3/122; G06F 3/1234; G06F 3/1259; G06F 3/1273; G06F 3/1285; H04N 1/00432; H04N 1/00472; H04N 1/00474; H04N 1/00482; H04N 1/32609; H04N 1/3263; H04N 1/32635; H04N 1/32641; H04N 2201/0094; H04N 2201/3215; H04N 2201/3219; H04N 2201/3221; H04N 2201/3273; H04N 2201/3274;

(Continued)

(56) References Cited

U.S. PATENT DOCUMENTS 8,593,674 B2 * 11/2013 Tonegawa ................. G06F 3/12
358/1.15
2002/0054335 A1 * 5/2002 Sekiguchi .......... H04N 1/00233
358/1.15

(Continued)

FOREIGN PATENT DOCUMENTS

JP 3719251 9/2005
JP 2008-098773 4/2008

*Primary Examiner* — Negussie Worku
(74) *Attorney, Agent, or Firm* — Workman Nydegger

(57) ABSTRACT

A controller stores, in a server apparatus, at least part of image data acquired by reading a image by a reading unit when a data size of the image data acquired by reading the image from a document exceeds an upper limit data size, and transmits, to the specified transmission destination, an e-mail indicating a storage destination when the image data is stored in the server apparatus.

15 Claims, 10 Drawing Sheets

(52) U.S. Cl.
CPC ..... *H04N 1/00244* (2013.01); *H04N 1/00795* (2013.01); *H04N 1/121* (2013.01)

(58) Field of Classification Search
CPC ........... H04N 1/00212; H04N 1/00214; H04N 1/00217; H04N 1/00244; H04N 1/00912; H04N 1/32037; H04N 1/32096; H04N 2201/0039
USPC .......................................................... 358/1.1
See application file for complete search history.

(56) References Cited

U.S. PATENT DOCUMENTS

| | | | |
|---|---|---|---|
| 2004/0207870 A1 | 10/2004 | Takahashi et al. | |
| 2007/0159652 A1* | 7/2007 | Sato ................... | H04N 1/00225 358/1.15 |
| 2011/0188078 A1* | 8/2011 | Tonegawa ................. | G06F 3/12 358/1.15 |
| 2014/0157149 A1* | 6/2014 | Nishizawa ......... | H04N 21/8456 715/752 |
| 2016/0231970 A1* | 8/2016 | Tabuki ................... | G06F 3/1232 |
| 2017/0230529 A1* | 8/2017 | Tachi ................... | H04N 1/32101 |
| 2021/0306474 A1* | 9/2021 | Hara ................... | H04N 1/00005 |

* cited by examiner

IMAGE READING APPARATUS, IMAGE READING SYSTEM, IMAGE READING CONTROL METHOD AND NON-TRANSITORY COMPUTER-READABLE STORAGE MEDIUM STORING PROGRAM

The present application is based on, and claims priority from JP Application Serial Number 2020-059835, filed Mar. 30, 2020, the disclosure of which is hereby incorporated by reference herein in its entirety.

BACKGROUND

1. Technical Field

The present disclosure relates to an image reading apparatus that reads an image from a document, an image reading system an image reading control method, and a non-transitory computer-readable storage medium storing a program.

2. Related Art

For example, JP-A-2008-98773 discloses an image reading apparatus including a reading unit that reads an image from a document. Such an image reading apparatus has a function (so-called "scan to e-mail") of transmitting an e-mail with image data acquired by reading an image from a document to a specified transmission destination, and can provide the acquired image data to a terminal device or the like that is not directly connected to the image reading apparatus.

Further, the image reading apparatus described in JP-A-2008-98773 has a function of dividing the acquired image data and transmitting an e-mail for each of the divided image data when it is not possible to secure a storage area for storing the image data acquired by reading the image from the document as a file.

However, in the image reading apparatus described in JP-A-2008-98773, since image data is attached to an e-mail, the image data is likely to be large. For example, when the data size exceeds the upper limit data size with which an image reading apparatus can transmit an e-mail or the upper limit data size with which an e-mail server apparatus can receive an e-mail, it may not be able to transmit the e-mail, and further improvement is desired.

SUMMARY

According to an aspect of the present disclosure, an image reading apparatus includes a reading unit that reads an image from a document, and a controller that controls the reading unit, wherein the controller is configured to transmit, to a specified transmission destination, an e-mail with image data acquired by reading an image by the reading unit, and when a data size of the image data acquired by reading the image by the reading unit exceeds an upper limit data size, stores, in a server apparatus, at least part of the image data acquired by reading the image by the reading unit, and transmits, to a specified transmission destination, an e-mail indicating a storage destination when the image data is stored in the server apparatus.

According to an aspect of the present disclosure, an image reading apparatus includes a reading unit that reads an image from a document, and a controller that controls the reading unit, wherein the controller is configured to store, in a server apparatus, at least part of image data acquired by reading an image by the reading unit, and transmits, to a specified transmission destination, an e-mail with the image data acquired by reading the image by the reading unit or the image data that is stored in the server apparatus when a data size of the image data acquired by reading the image by the reading unit does not exceed an upper limit data size, while transmits, to the specified transmission destination, an e-mail indicating a storage destination when the image data is stored in the server apparatus when the data size of the image data acquired by reading the image by the reading unit exceeds an upper limit data size.

According to an aspect of the present disclosure, an image reading system includes an image reading apparatus that reads an image from a document, and a server apparatus configured to communicate with the image reading apparatus, wherein the image reading apparatus includes a reading unit that reads an image from a document and a controller that controls the reading unit, and wherein the controller is configured to transmit, to a specified transmission destination, an e-mail with image data acquired by reading an image by the reading unit, and when a data size of the image data acquired by reading the image by the reading unit exceeds an upper limit data size, stores, in the server apparatus, at least part of the image data acquired by reading the image by the reading unit, and transmits, to a specified transmission destination, an e-mail indicating a storage destination when the image data is stored in the server apparatus.

According to an aspect of the present disclosure, an image reading system includes an image reading apparatus that reads an image from a document, and a server apparatus configured to communicate with the image reading apparatus, wherein the image reading apparatus includes a reading unit that reads an image from a document and a controller that controls the reading unit, and wherein the controller is configured to store, in a server apparatus, at least part of image data acquired by reading an image by the reading unit, and transmits, to a specified transmission destination, an e-mail with the image data acquired by reading the image by the reading unit or the image data that is stored in the server apparatus when a data size of the image data acquired by reading the image by the reading unit does not exceed an upper limit data size, while transmits, to the specified transmission destination, an e-mail indicating a storage destination when the image data is stored in the server apparatus when the data size of the image data acquired by reading the image by the reading unit exceeds an upper limit data size.

According to an aspect of the present disclosure, an image reading control method includes a first transmission step of being configured to transmit an e-mail with image data acquired by reading an image from a document to a specified transmission destination, a storage step of storing, in a server apparatus, at least part of the image data acquired by reading the image from the document when a data size of the image data acquired by reading the image from the document exceeds an upper limit data size, and a second transmission step of transmitting, to a specified transmission destination, an e-mail indicating a storage destination when the image data is stored in the server apparatus.

According to an aspect of the present disclosure, an image reading control method includes a storage step of being configured to store, in a server apparatus, at least part of image data acquired by reading an image from a document, a first transmission step of transmitting, to a specified transmission destination, an e-mail with the image data acquired by reading the image from the document or the image data that is stored in the server apparatus when a data size of the image data acquired by reading the image from the document does not exceed an upper limit data size, and a second transmission step of transmitting, the specified transmission destination, an e-mail indicating a storage destination when the image data is stored in the server apparatus when the data size of the image data acquired by reading the image from the document exceeds the upper limit data size.

According to an aspect of the present disclosure, in a non-transitory computer-readable storage medium storing a program, the program includes a first transmission step of being configured to transmit an e-mail with image data acquired by reading an image from a document to a specified transmission destination, a storage step of storing, in a server apparatus, at least part of the image data acquired by reading the image from the document when a data size of the image data acquired by reading the image from the document exceeds an upper limit data size, and a second transmission step of transmitting, to a specified transmission destination, an e-mail indicating a storage destination when the image data is stored in the server apparatus.

According to an aspect of the present disclosure, in a non-transitory computer-readable storage medium storing a program, the program includes a storage step of being configured to store, in a server apparatus, at least part of image data acquired by reading an image from a document, a first transmission step of transmitting, to a specified transmission destination, an e-mail with the image data acquired by reading the image from the document or the image data that is stored in the server apparatus when a data size of the image data acquired by reading the image from the document does not exceed an upper limit data size, and a second transmission step of transmitting, the specified transmission destination, an e-mail indicating a storage destination when the image data is stored in the server apparatus when the data size of the image data acquired by reading the image from the document exceeds the upper limit data size.

DESCRIPTION OF EXEMPLARY EMBODIMENTS

First Embodiment

Hereinafter, the first embodiment of an image reading apparatus will be described with reference to the drawings.

Figure 1:
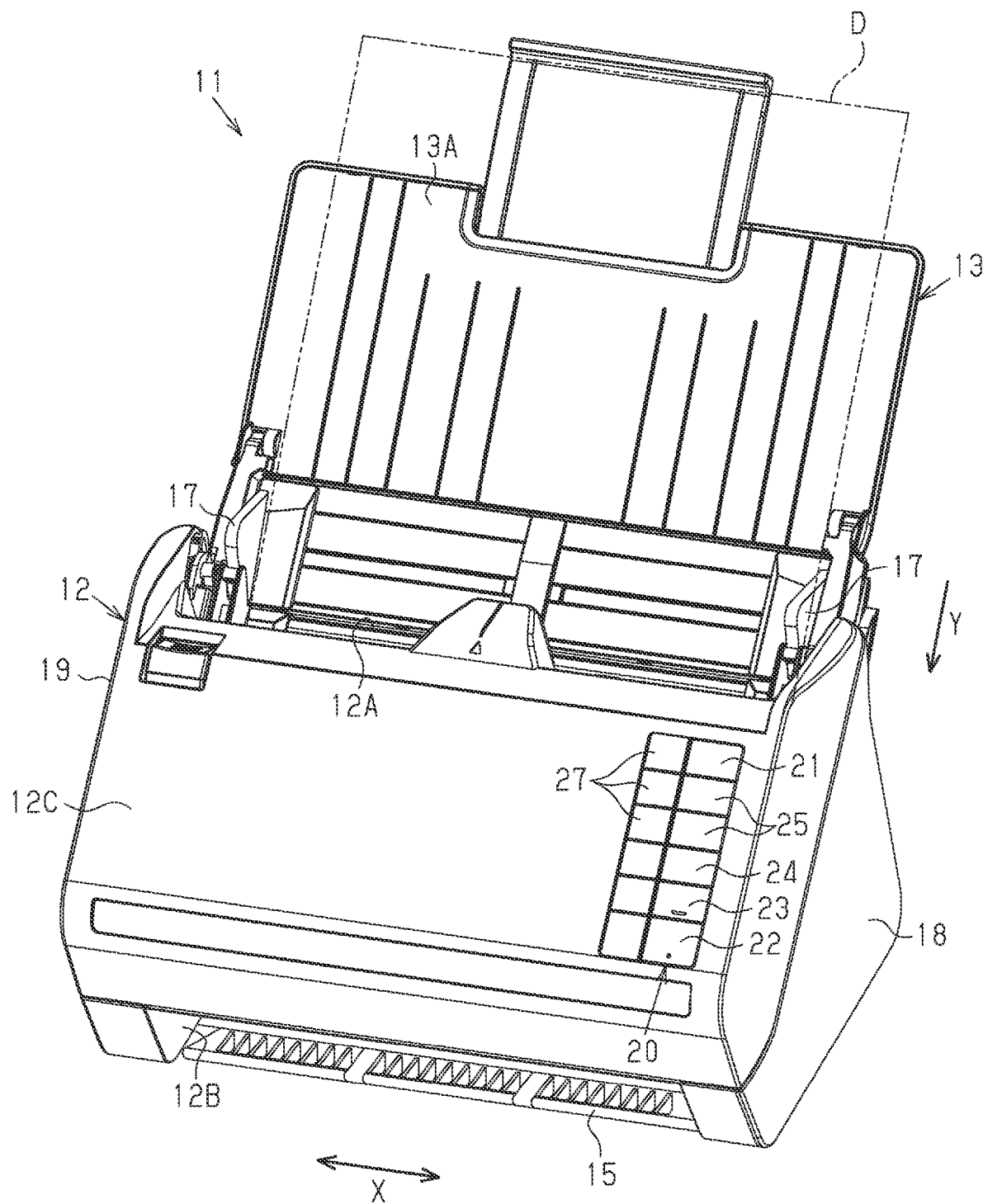
FIG. 1 is a perspective view of an image reading apparatus according to the first embodiment.

As shown in FIG. 1, an image reading apparatus 11 of the present embodiment includes a main body 12 having a substantially trapezoidal shape in side view, and a document support 13 on which a document D to be image-read is placed (set). A stacker 15 is housed in the main body 12 under a discharge port 12B so as to be slidable in the front/rear direction.

The document support 13 has a flat placement face 13A on which a plurality of documents D can be placed by extending diagonally upward from the rear of the main body 12. The document support 13 is provided with a pair of edge guides 17 that can slide in a width direction X that intersects (particularly orthogonally) with a transport direction Y in which the document D is transported. The document D placed on the placement face 13A is positioned in the width direction X with respect to a feed port 12A by being held between the pair of edge guides 17. The width direction X is the main scanning direction when the image reading apparatus 11 reads an image of the document D, and the transport direction Y is the sub scanning direction.

The document D placed on the document support 13 is fed one by one from the feed port 12A that opens at the upper part of the main body 12 into the main body 12. The fed document D is transported in the main body 12 along a predetermined transport path 29 (see FIG. 2), and is discharged from the discharge port 12B that opens at the lower front of the main body 12 after its image is read in a reading region SA during the transport.

An operation unit 20 is provided on a front face portion 12C of the main body 12. The operation unit 20 includes a plurality of operation switches 21 to 25 that is operated by the user when giving an instruction to the image reading apparatus 11. Specifically, the operation unit 20 includes a power switch 21, a start switch 22, a stop switch 23, a setting switch 24 for setting various setting conditions, a switch 25 having other functions, and the like.

At a position adjacent to the operation unit 20, for example, a notification unit 27 including an indicator light that can at least either light up or blink, and light out by an LED or the like, or can change the lighting color at the time of lighting. The notification unit 27 notifies the user of information necessary for the user, such as power on/off and the currently selected mode, by turning on/off or changing the lighting color. In addition, the configuration may be such that a display unit (not shown) including, for example, a liquid crystal panel is provided at a predetermined position on the front face portion 12C of the main body 12, and display by the display unit makes notification of necessary information.

Figure 2:
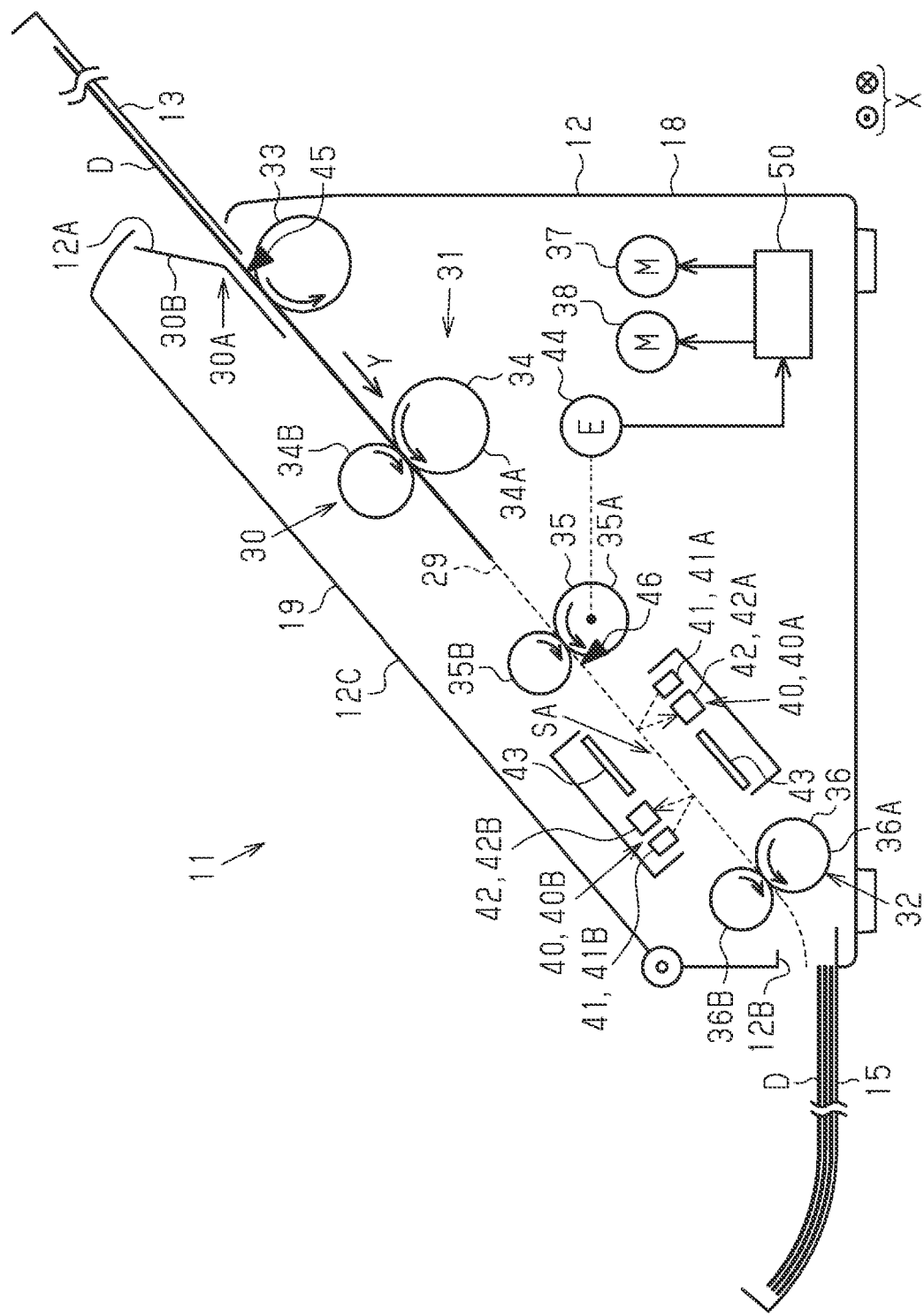
FIG. 2 is a schematic side sectional view of the image reading apparatus.

As shown in FIG. 2, the main body 12 includes a main body portion 18 and a cover portion 19 rotatably coupled around a front end portion of the main body portion 18. The main body 12 has the transport path 29 (transport passage) extending from the feed port 12A to the discharge port 12B between the main body portion 18 and the cover portion 19.

A transport mechanism 30 that transports the document D is provided in the main body 12. The transport mechanism 30 includes a feeding unit 30A that feeds the documents D placed (set) on the document support 13 one by one while guiding them into the main body 12, a transport unit 31 that transports the fed document D along the transport path 29 so that the fed document D passes through the reading region SA, and a discharge unit 32 that discharges the document D after the image is read by the transport unit 31 during the transport. The transport mechanism 30 has an automatic document feed function that sequentially transports a plurality of documents D placed on the document support 13 one by one along the transport path 29 so that they pass through the reading region SA.

The feeding unit 30A includes one feed roller 33 (pickup roller) facing a feed guide 30B at the upstream end position of the transport path 29 in the main body 12. The feeding unit 30A feeds the plurality of documents D placed on the document support 13 one by one from the feed port 12A along the feed guide 30B.

The transport unit 31 includes a pair of feed rollers 34 disposed at a position downstream of the feed roller 33 in the transport direction Y and a pair of transport rollers 35 disposed at a position upstream of the reading region SA in the transport direction Y. The pair of feed rollers 34 is composed of a drive roller 34A and a separation roller 34B (retard roller). The pair of transport rollers 35 is composed of a drive roller 35A and a driven roller 35B.

The discharge unit 32 includes a pair of discharge rollers 36 disposed at a position downstream of the reading region SA in the transport direction Y. The pair of discharge rollers 36 is composed of a drive roller 36A and a driven roller 36B. The pair of discharge rollers 36, together with the pair of transport rollers 35, is also responsible for transporting the document D during reading.

In this way, the feed roller 33, the pair of feed rollers 34, the pair of transport rollers 35, and the pair of discharge rollers 36 are disposed in order from upstream in the transport direction Y, and are disposed at intervals in the width direction X.

The plurality of rollers 33, 34A of the feed system is rotationally driven by the power of a feed motor 37, which is the power source for them. The plurality of documents D placed on the document support 13 is fed by the feed roller 33 from the feed port 12A into the main body 12 one by one in order from the lowest document. In this way, the feeding unit 30A (the rollers 33, 34A, and the like) is driven by the feed motor 37 as a power source.

Further, the separation roller 34B of the feed system and the drive rollers 35A and 36A of the transport system are rotationally driven by the power of a transport motor 38, which is the power source for them. The document D fed into the main body 12 by the feed roller 33 is transported to the reading region SA and then discharged from the discharge port 12B. In this way, the transport unit 31 (the pair of transport rollers 34, and the like) and the discharge unit 32 (the pair of discharge rollers 36, and the like) are driven by the transport motor 38 as a common power source.

Further, the drive rollers 35A and 36A are rotationally driven so as to transport the document D at the same transport speed (reading speed) when the document D is read. The driven rollers 35B and 36B are rotated by the rotation of the drive rollers 35A and 36A, which are paired with the driven rollers 35B and 36B, respectively.

Further, an encoder 44 (for example, a rotary encoder) capable of detecting the rotation of one drive roller of the transport system among the plurality of roller pairs 34 to 36 is provided in the main body 12. The encoder 44 outputs, to a controller 50, a detection signal including pulses whose number is proportional to the amount of rotation of the drive roller. Therefore, the controller 50 can grasp the position (transport position) of the document D being transported by the controller 50 and the transport speed based on the detection signal of the encoder 44.

Further, a document sensor 45 that detects the presence/absence of the document D set on the document support 13 is disposed between the pair of feed rollers 33. The document sensor 45 is, for example, a contact sensor having a lever. When the document D is set on the document support 13, the document sensor 45 is turned on when the set document D pushes the lever.

Further, a document presence/absence sensor 46 capable of detecting the presence/absence of the document D is disposed at a position slightly downstream of the nip point of the pair of transport rollers 35 in the transport direction Y. The document presence/absence sensor 46 is, for example, a contact sensor having a lever (contactor). The document presence/absence sensor 46 detects the document D when the front end of the document D pushes the lever and is turned on, and when the rear end of the document D passes by and the lever is not pushed, the document presence/absence sensor 46 does not detect the document D and is turned off. Therefore, based on the detection signal (ON/OFF) of the document presence/absence sensor 46, the controller 50 detects that the front end of the document D has passed through the pair of transport rollers 35 and the rear end of the document D has passed through the pair of transport rollers 35. The detection result by the document presence/absence sensor 46 detecting the front end and the rear end of the document D is used for determining the start timing and the end timing of the reading operation of a reading unit 40 (40A, 40B) described later. Further, since the document presence/absence sensor 46 can detect the front end and the rear end of the document D, the document presence/absence sensor 46 can detect the length of the document D in the transport direction Y, that is, the document size determined from the length based on the transport distance of the document D from when the front end of the document D is detected to when the rear end is detected. The document presence/absence sensor 46 may be a non-contact sensor such as an optical sensor.

The reading unit 40 that reads an image is provided in the main body 12 of the image reading apparatus 11. The pair of reading units 40 is provided on opposite sides of the transport path 29 at a position between the pair of transport rollers 35 and the pair of discharge rollers 36 in the transport direction Y. In the present embodiment, the pair of reading units 40 includes a first reading unit 40A that reads the front face (lower face) of the document D transported along the transport path 29, and a second reading unit 40B that reads the back face (upper face) of the document D transported along the transport path 29. Although they are located slightly offset from each other in the transport direction Y, the configuration may not include one of the reading units.

The pair of reading units 40 includes a light source 41 capable of irradiating the document D being transported with light by irradiating the reading region SA with light, and an image sensor 42 capable of reading an image from the document D. In the normal reading mode, only the first reading unit 40A performs the reading operation to read the front face of the document D, and in the double-sided read mode, both the first reading unit 40A and the second reading unit 40B perform the reading operation to read opposite sides (front face and back face) of the document D.

The light source 41 is composed of, for example, an LED, a fluorescent lamp, or the like. The image sensor 42 receives the reflected light when the light emitted from the light source 41 is reflected by the document D to convert the received light into an electric signal to output a pixel signal having a value corresponding to the amount of received light. In this way, the image sensor 42 is a sensor that reads an image. The image sensor 42 is, for example, a linear image sensor. The image reading apparatus 11 is capable of performing color scanning and monochrome scanning (grayscale scanning). In the following, the light source 41 and the image sensor 42 may be referred to as a first light source 41A and a first image sensor 42A for the first reading unit 40A, and may be referred to as a second light source 41B and a second image sensor 42B for the second reading unit 40B, respectively.

The image sensor 42 is, for example, a contact type image sensor in which a plurality of photoelectric conversion elements is disposed in a row along a main scanning direction X. Further, the image sensor 42 is specifically a complementary metal oxide semiconductor (CMOS) image sensor. The image sensor 42 photoelectrically converts the light received by each photoelectric conversion element to output a pixel signal having a value corresponding to the amount of received light.

Further, a color reference plate 43 is disposed so as to face the image sensor 42 with the transport path 29 disposed therebetween. The color reference plate 43 is disposed in a region that includes the region of the document D and is wider than the region of the document D in the region to be read by the reading unit 40. Therefore, the color reference plate 43 is a member that makes it possible to grasp whether the image read by the reading unit 40 is the region of the document D. That is, the color reference plate 43 is a background plate, as an example of a background member, that can be read as the background of the document D. Further, the color reference plate 43 is a member for obtaining a white reference value for shading correction, and a white reference plate exhibiting white or a gray reference plate exhibiting gray is used as the color reference plate 43. As a result, the color reference plate 43 is read as a white reference image, and the white reference value is generated based on the read white reference image. In the case of a gray reference plate, the color reference plate 43 is read as the background (gray background) of the document and used for detecting the position and region of the document D. When a sensor that detects the document region is separately provided, the color reference plate 43 is preferably a white reference plate. Further, the color reference plate 43 is not limited to have the plate shape, and may have any shape and color as long as it is a reference member for obtaining a white reference value that is a reference for luminance.

The image reading apparatus 11 includes the controller 50. The controller 50 controls the image reading apparatus 11 when a job to read an image from document D is input based on an operation signal from the operation unit 20 (see FIG. 1) operated by the user or a read instruction signal (read instruction) from a host device 100 described later. When performing reading control, the controller 50 controls the feed motor 37, the transport motor 38, and the reading unit 40 (40A, 40B) to acquire image data by reading an image from the document D.

Figure 3:
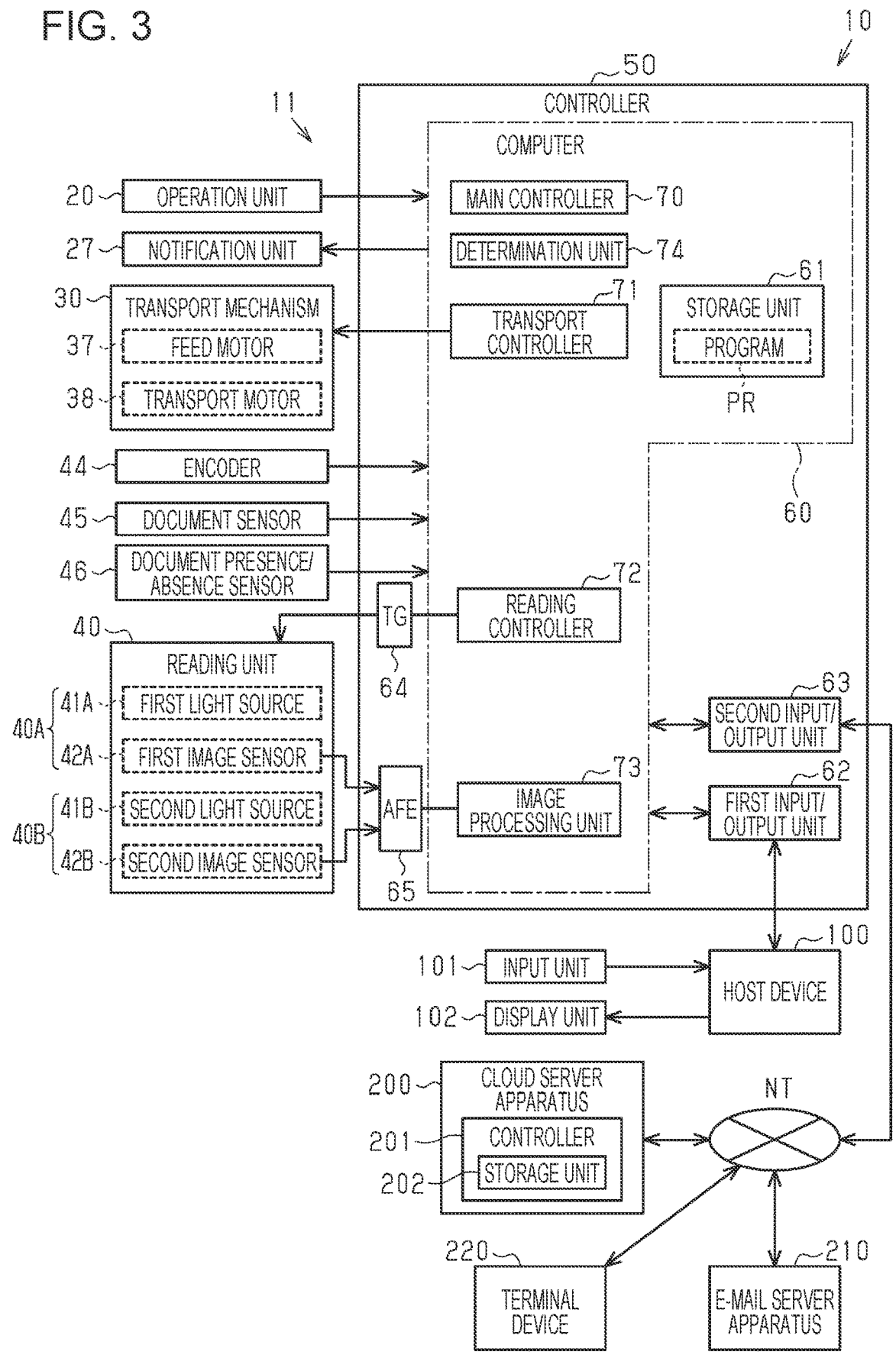
FIG. 3 is a block diagram showing an electrical configuration of the image reading apparatus.

Next, the electrical configuration of the image reading apparatus 11 will be described with reference to FIG. 3. As shown in FIG. 3, the image reading apparatus 11 is coupled to the host device 100 through a communication cable. The host device 100 is, for example, a personal computer (hereinafter, also referred to as a "PC"), and includes an input unit 101 and a display unit 102 that are electrically coupled to the main body of the personal computer. The host device 100 includes a reading driver including software having a function of giving a reading instruction to the image reading apparatus 11 by installing a reading driver program. The host device 100 is not limited to a PC, but may be a mobile information terminal (PDA (Personal Digital Assistants)), a tablet PC, a smart device such as a smartphone, or the like.

Further, the image reading apparatus 11 is communicably connected to a cloud server apparatus 200 via a network NT, which is an example of a wide area communication network. The cloud server apparatus 200, which is an example of the server apparatus, is a server apparatus that employs cloud computing that provides an information processing service to a client via the network NT.

The cloud server apparatus 200 has a built-in controller 201 that collectively controls the cloud server apparatus 200. The controller 201 includes a storage unit 202 including a RAM, a nonvolatile memory, and the like. The storage unit 202 stores a program that controls the cloud server apparatus 200. Moreover, in the present embodiment, the cloud server apparatus 200 stores (storage) image data transmitted from the image reading apparatus 11 via the network NT in the storage unit 202, and has a function of transmitting (providing) image data via a network NT in response to a request from a client device such as the image reading apparatus 11 or a terminal device 220. As described above, in the present embodiment, the image reading apparatus 11 can store the image data in the cloud server apparatus using cloud computing by communicating with the cloud server apparatus 200 via the network NT.

Further, the image reading apparatus 11 is communicably connected to an e-mail server apparatus 210 via the network NT. The e-mail server apparatus 210 is a server apparatus that transmits/receives and manages an e-mail via the network NT. In the present embodiment, the e-mail managed by the e-mail server apparatus 210 includes an e-mail with the image data read by the image reading apparatus 11. In the present embodiment, the e-mail server apparatus 210 receives an e-mail from the image reading apparatus 11 via the network NT, and manages the e-mail for each transmission destination included in the e-mail. The e-mail server apparatus 210 transmits an e-mail in response to a request from the terminal device 220 via the network NT.

Further, in the present embodiment, the terminal device 220 is communicably connected to the network NT. Therefore, the terminal device 220 can receive the image data stored in the cloud server apparatus 200 via the network NT. Further, the terminal device 220 can receive the e-mail stored in the e-mail server apparatus 210 via the network NT.

In the present embodiment, the image reading system 10 includes the image reading apparatus 11, the host device 100, the cloud server apparatus 200, the e-mail server apparatus 210, the terminal device 220, and the network NT, but the present disclosure is not limited to this, but, for example, may be a configuration including at least the image reading apparatus 11.

When the user operates the operation unit 20 or the input unit 101 of the host device 100, the setting conditions related to the image reading process are set. That is, the setting conditions are set by the input by the user. The setting conditions include reading conditions including a reading resolution, a reading color, a single-sided reading/a double-sided reading, and the like, and storage conditions including a read data (image data) storage format, a transfer method, and a storage destination.

The reading resolution includes, for example, 300 dpi/600 dpi, and the reading color includes monochrome (gray scale)/color. The storage format includes a PDF format, a JPEG format, a GIF format, and the like.

Further, the transfer method includes a transfer to the host device 100, an e-mail transfer to the specified transmission destination (e-mail address), and a cloud transfer to the cloud server apparatus 200, and the storage destination address is designated to the storage destination. Specifically, in the present embodiment, according to an input by the user, any of a normal transfer in which image data is provided to the host device 100, an e-mail transfer (so-called "scan to e-mail") in which an e-mail with image data generally attached is transferred to the e-mail server apparatus 210, and a cloud transfer (so-called "scan to cloud") in which image data is transferred to the cloud server apparatus 200 is performed. Specifically, the e-mail transfer and the cloud transfer are implemented by communicating with the e-mail server apparatus 210 and the cloud server apparatus 200 via the network from the image reading apparatus 11 without through the host device 100. Therefore, for example, in FIG. 3, the image reading apparatus 11 may be used without being connected to the host device 100 (so-called "stand-alone"). When the image reading apparatus 11 is connected to the network NT, the e-mail transfer and the CLOUD transfer can be performed.

The image reading apparatus 11 has the built-in controller 50 that controls the image reading apparatus 11 in an integrated manner. The controller 50 includes a computer 60 including a microprocessor or the like. The computer 60 includes a storage unit 61 (memory) including a RAM, a nonvolatile memory, and the like. The storage unit 61 stores a program PR or the like to be executed during read control. In the present embodiment, the program PR includes the image reading control process at the time of e-mail transfer shown in the flowchart of FIG. 4. Further, the storage unit 61 stores the setting conditions by the input by the user.

Further, the storage unit 61 temporarily stores the image data of the image read by the reading unit 40. Specifically, in the present embodiment, the storage unit 61 is allocated an image data storage area for temporarily storing the image data of the image read by the reading unit 40, and the storage upper limit data size within which the image data can be stored is defined for the image data storage area. As described above, the controller 50 includes the storage unit 61 that stores image data with up to the storage upper limit data size. In the present embodiment, the storage upper limit data size corresponds to an example of a predetermined data size. The storage upper limit data size may be constant or may change dynamically.

Further, the controller 50 includes a first input/output unit 62 including an input/output interface for inputting/outputting various types of data and signals to/from the host device 100. The various types of data include image data read by the image reading apparatus 11. Further, the controller 50 includes a second input/output unit 63 including an input/output interface for inputting/outputting various types of data and signals to/from the network NT. The various types of data include image data read by the image reading apparatus 11.

Further, the controller 50 includes a timing generator 64 (hereinafter, also referred to as a "TG64") that outputs, to the image sensors 42A and 42B, a pulse signal that defines various types of operation timing including a reading operation. Further, the controller 50 includes an analog front end 65 (hereinafter, also referred to as an "AFE65") that performs analog/digital conversion (A/D conversion) of a pixel signal input from the image sensors 42A and 42B.

The computer 60 includes a main controller 70, a transport controller 71, a reading controller 72, and an image processing unit 73, and a determination unit 74 as functional parts composed of software internally configured by executing the program PR. The main controller 70 comprehensively controls the image reading apparatus 11.

The transport controller 71 drives and controls the feed motor 37 and the transport motor 38 according to the instruction from the main controller 70. When the feed roller 33 is rotated by driving the feed motor 37, a plurality of documents D set in the document support 13 is fed into the main body 12 one by one in order from the lowest document. Further, when the feed motor 37 is driven, the one drive roller 34A constituting the pair of feed rollers 34 is rotationally driven, and when the transport motor 38 is driven, the other separation roller 34B is rotationally driven. In particular, the transport controller 71 drives and controls the feed motor 37 and the transport motor 38 so that the document D is transported at a reading speed corresponding to the reading resolution (for example, 300/600 dpi) in the reading region SA in the middle of the transport path 29. For example, when the reading resolution is relatively low (for example, 300 dpi), the document D is transported at a high speed, and when the reading resolution is relatively high (for example, 600 dpi), the document D is transported at a low speed.

The reading controller 72 controls the reading unit 40 through the TG 64, and causes the reading unit 40 to read the image of the document D. In particular, the reading controller 72 outputs a pulse signal to the TG64 that defines the operation timing of various operations including the reading operation to the image sensor 42 to control the light emission of the light source 41 via a light source drive unit (not shown) to irradiate the reading region SA with light from the light source 41.

When the digital signal of the image read by the reading unit 40 is input via the AFE 65, the image processing unit 73 temporarily stores image data based on the input digital signal to perform a known correction process such as a shading correction on the stored image data to generate image data of the document D. The image processing unit 73 performs various corrections such as gamma correction in addition to the shading correction to output the corrected image data.

In the present embodiment, the determination unit 74 determines whether the data size of the image data acquired by causing the reading unit 40 to read the image from the document D exceeds a transmission upper limit data size. Specifically, when a job including a setting condition whose transfer method is the e-mail transfer is input, after the job is finished and causing the reading unit 40 to read the images from all the documents D, the determination unit 74 determines whether the total data size of the image data acquired from all the documents D exceeds the transmission upper limit data size.

The transmission upper limit data size is the upper limit data size that can be transmitted from the image reading apparatus 11 to the e-mail server apparatus 210 when a job including a setting condition whose transfer method is the e-mail transfer is input, and can be set according to the user's input. Further, in the present embodiment, the transmission upper limit data size is a size at which an e-mail containing only general text data can be sufficiently transmitted, and a size at which an e-mail with image data having an extremely large data size cannot be transmitted.

In the present embodiment, in a case where when a job including a setting condition whose transfer method is the e-mail transfer is input, the total data size of the image data does not exceed the transmission upper limit data size, the controller 50 transmits the e-mail with the image data to the specified transmission destination. On the other hand, when the total data size of the image data exceeds the transmission upper limit data size, the controller 50 stores the image data itself in the cloud server apparatus 200, and transmits, to the specified transmission destination, an e-mail indicating the storage destination of the data. As a result, when the total data size of the image data exceeds the transmission upper limit data size, it is possible to prevent the image data from being transmitted as a result of transmitting the image data.

Next, the image reading control process at the time of e-mail transfer performed by the computer 60 will be described with reference to the flowchart shown in FIG. 4. The image reading control process at the time of e-mail transfer is a process performed when a job including a setting condition whose transfer method is the e-mail transfer is input.

Figure 4:
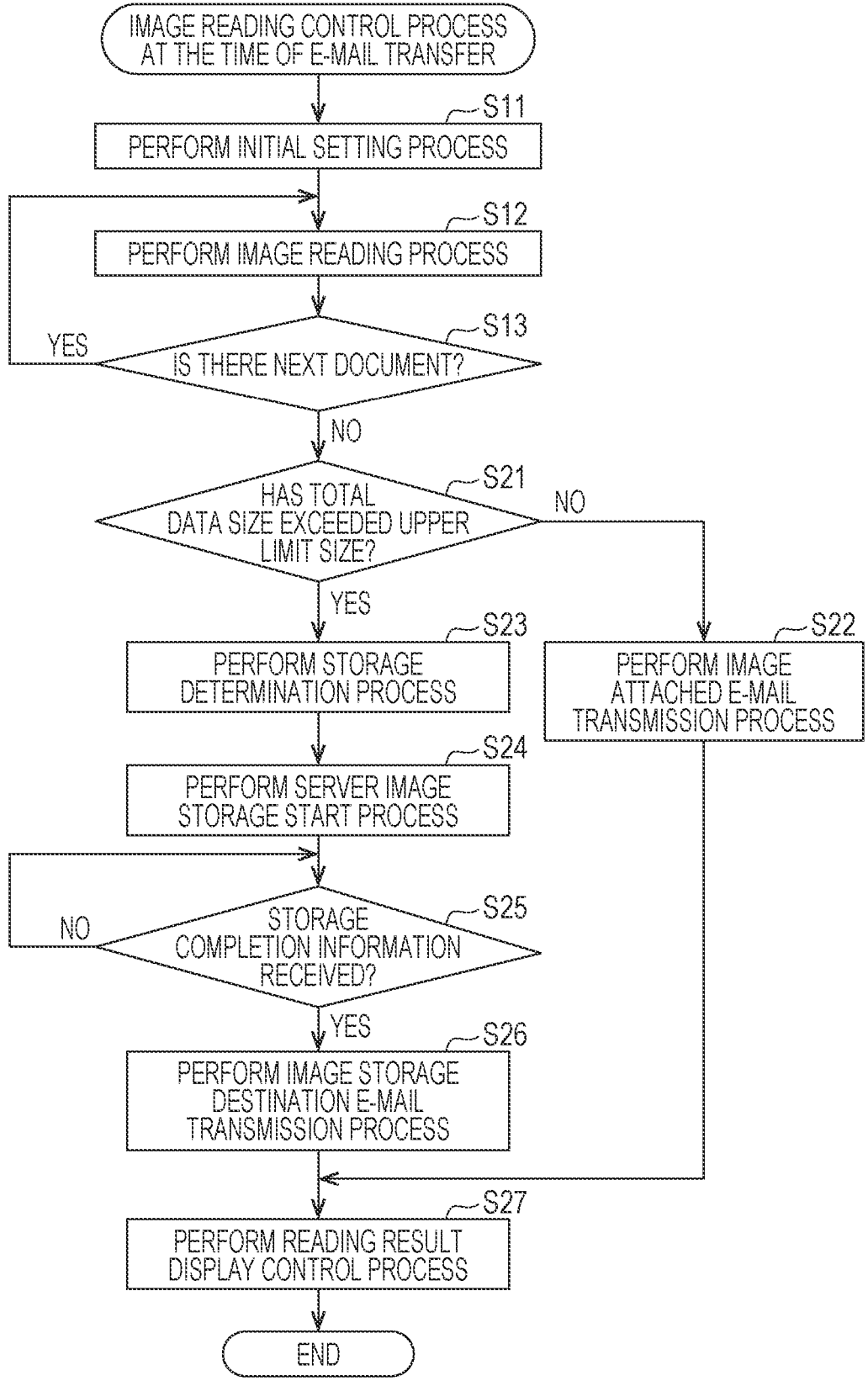
FIG. 4 is a flowchart showing an image reading control process at the time of e-mail transfer.

As shown in FIG. 4, in step S11, the controller 50 performs the initial setting process. In this process, the controller 50 specifies the setting condition included in the job and performs the initial setting corresponding to the setting condition. Specifically, the controller 50 specifies the transmission upper limit data size for the data size of the image data attached to the e-mail. When this process is completed, the controller 50 advances the process to step S12.

In step S12, the controller 50 performs the image reading process. In this process, the controller 50 starts to feed and transport one document D from the documents placed on the document support 13. That is, the controller 50 starts to drive the feed motor 37 and the transport motor 38, and starts to feed one document D by rotationally driving the rollers 33, 34A, 35A, and 36A. Specifically, the controller 50 reads the reading resolution set as the reading condition from the storage unit 61, and rotates the rollers 33, 34A, 35A, and 36A so that the document D is transported at a transport speed corresponding to the reading resolution. When it is determined, based on the detection signal from the document presence/absence sensor 46, that the reading start timing has come, the controller 50 causes the reading unit 40 to start reading of the image, temporarily stores, in the storage unit 61, the image data acquired by reading the image by the reading unit 40, and when it is determined that the reading end timing has come, causes the reading unit 40 to end reading of the image. When this process is completed, the controller 50 advances the process to step S13.

In step S13, the controller 50 detects, based on the detection signal from the document sensor 45, the presence or absence of the document D placed on the document support 13, and determines whether there is the next document D. When it is determined that there is a next document D, the controller 50 advances the process to step S12 again and reads an image from the next document D. On the other hand, when the controller 50 determines that there is no next document D, the process proceeds to step S21. For example, when the distance between the two documents D being transported can be secured, the feeding of the next document D may be started without waiting for the completion of reading the preceding document D.

In step S21, the controller 50 specifies the total data size of the image data that is acquired by causing the reading unit 40 to read the image after the job is input to be stored in the storage unit 61, and determines whether the total data size exceeds the transmission upper limit data size. Specifically, when the reading unit 40 is caused to read an image from a plurality of documents D after the job is input, and when the reading unit 40 is caused to read an image from one document D by double-sided reading after the job is input, the controller 50 identifies the total data size of all the image data. In this way, after causing the reading unit 40 to read the images from all the documents D in response to the input of the job, the controller 50 (determination unit 74) determines whether the total data size of the image data of all the documents D acquired by reading the images by the reading unit 40 exceeds the transmission upper limit data size. Such processing corresponds to an example of a determination step.

When the controller 50 determines that the total data size does not exceed the transmission upper limit data size, the process proceeds to step S22. On the other hand, when the controller 50 determines that the total data size exceeds the transmission upper limit data size, the process proceeds to step S23.

In step S22, the controller 50 performs the image attachment e-mail transmission process. In this process, the controller 50 attaches, to the e-mail, the image data of the image read after the job is input, and transmits the e-mail with the image data to the e-mail server apparatus 210 via the network NT with the e-mail address included in the job as the transmission destination. In this way, the controller 50 can transmit, to a specified transmission destination, the e-mail with the image data acquired by reading the image by the reading unit 40. Specifically, when the total data size of the image data acquired by reading the image by the reading unit 40 does not exceed the transmission upper limit data size, the controller 50 transmits the e-mail with the acquired image data to the specified transmission destination. Such processing corresponds to an example of a first transmission step. When this process is completed, the controller 50 advances the process to step S27.

Then, in step S27, the controller 50 performs the reading result display control process for causing the notification unit 27 of to make notification of information about the result of image reading performed in connection with the input of the job. As described above, when the controller 50 performs the step S27 after performing the step S22, the controller 50 causes the notification unit 27 to make notification that the e-mail with the acquired image data is transmitted as a result of causing the reading unit 40 to read the image. When this process is completed, the image reading control process at the time of e-mail transfer is completed.

On the other hand, in step S23, the controller 50 performs a storage determination process. In this process, the controller 50 transmits, to the cloud server apparatus 200 via the network NT, the storage request information requesting the storage of the image data. The storage request information includes apparatus identification information that can identify the image reading apparatus 11.

In the present embodiment, when the cloud server apparatus 200 receives the storage request information from the image reading apparatus 11 via the network NT, the controller 201 determines whether the storage allowable condition for allowing the storage of the image data is satisfied. Then, when the controller 201 determines that the storage allowable condition is satisfied, the controller 201 transmits, to the image reading apparatus 11 that has transmitted the storage request information, the storage allowable information that allows the storage of the image data. When the controller 201 determines that the storage allowable condition is not satisfied, the controller 201 transmits, to the image reading apparatus 11, the storage prohibition information prohibiting the storage of the image data.

Specifically, the controller 201 refers to a user registration database stored in the storage unit 202, and determines that the storage allowable condition is not satisfied when the information matching the apparatus identification information included in the storage request information is not registered. When the information matching the apparatus identification information included in the storage request information is registered, the controller 201 determines that the storage allowable condition is satisfied to transmit the storage allowable information to the image reading apparatus 11.

When the controller 50 receives the storage allowable information from the cloud server apparatus 200, the controller 50 determines that the storage of the image data is allowed, and the process proceeds to step S24. In the present embodiment, when the controller 50 receives the storage prohibition information from the cloud server apparatus 200, the controller 50 advances the process to step S27 without performing steps S24 to S26. In this case, in step S27, the controller 50 causes the notification unit 27 to make notification that the e-mail with the acquired image data cannot be transmitted or stored in the cloud server apparatus 200, and the image reading control process at the time of e-mail transfer is completed.

In step S24, the controller 50 performs a server image storage start process. In this process, the controller 50 starts to transmit image data to the cloud server apparatus 200 via the network NT. This image data is image data acquired by causing the reading unit 40 to read the image after the job is input to be stored in the storage unit 61. In this way, when the total data size of the image data acquired by reading the image by the reading unit 40 exceeds the transmission upper limit data size, the controller 50 reads the acquired image data from the storage unit 61 to store, in the cloud server apparatus 200, the image data stored in the storage unit 61. Such a process corresponds to an example of a storage step. When this process is completed, the controller 50 advances the process to step S25.

In the present embodiment, when the cloud server apparatus 200 receives the image data from the image reading apparatus 11, the controller 201 stores the image data in the storage unit 202. Then, when storing all the image data in the storage unit 202, the controller 201 generates a one-time password, associates the image data storage destination with the one-time password, and stores the associated image data in the image data management database of the storage unit 202. Subsequently, the controller 201 transmits, to the image reading apparatus 11, the storage completion information including the image data storage destination and the one-time password.

In step S25, the controller 50 determines whether the storage completion information is received from the cloud server apparatus 200. When the controller 50 determines that the storage completion information is not received from the cloud server apparatus 200, the controller 50 performs step S25 again. On the other hand, when the controller 50 determines that the storage completion information is received from the cloud server apparatus 200, the controller 50 advances the process to step S26. In this way, the controller 50 waits for the storage completion information until it receives the storage completion information from the cloud server apparatus 200.

In step S26, the controller 50 performs the image storage destination e-mail transmission process. In this process, the controller 50 generates an e-mail indicating the storage destination of the image data and the one-time password from the storage completion information, and transmits the e-mail to the e-mail server apparatus 210 via the network NT with the e-mail address included in the job as the transmission destination. In this way, when the total data size of the image data acquired by reading the image by the reading unit 40 exceeds the transmission upper limit data size, the controller 50 transmits, to the specified transmission destination, the e-mail indicating the storage destination when the image data is stored in the cloud server apparatus 200. Such a process corresponds to an example of a second transmission step.

Then, the controller 50 deletes the image data stored in the storage unit 61 in response to the input of the current job, and secures an area within which the image data can be stored in response to the input of the next and subsequent jobs. When this process is completed, the controller 50 advances the process to step S27.

Then, in step S27, the controller 50 performs the reading result display control process for causing the notification unit 27 of to make notification of information about the result of image reading performed in connection with the input of the job. In this way, when the controller 50 performs step S27 after performing step S24, the controller 50 causes the notification unit 27 to make notification that the acquired image data is stored in the cloud server apparatus 200 as a result of causing the reading unit 40 to read the image. When this process is completed, the image reading control process at the time of e-mail transfer is completed.

Further, in the present embodiment, when the cloud server apparatus 200 receives the image data request information requesting the download of the image data from the terminal device 220, the controller 201 determines whether the download request is allowed. The image data request information includes information indicating a storage destination of the image data and a one-time password.

Specifically, the controller 201 refers to the image data management database of the storage unit 202, and determines that the download request is allowed when the combination of the image data storage destination and the one-time password is registered. The controller 201 determines that the download request is not allowed when the combination of the image data storage destination and the one-time password is not registered.

When the controller 201 determines that the download request is allowed, the controller 201 starts to transmit the image data to the terminal device 220. When the transmission of the image data to the terminal device 220 is completed, the controller 201 deletes, from the storage unit 202, the image data whose transmission is completed, while deletes, from the image data management database of the storage unit 202, the combination of the storage destination of the image data whose transmission is completed and the one-time password. By deleting, from the storage unit 202, the image data transmitted to the terminal device 220 in this way, it is possible to secure the storage capacity, of the image data, that can be stored in the storage unit 202.

Figure 5:
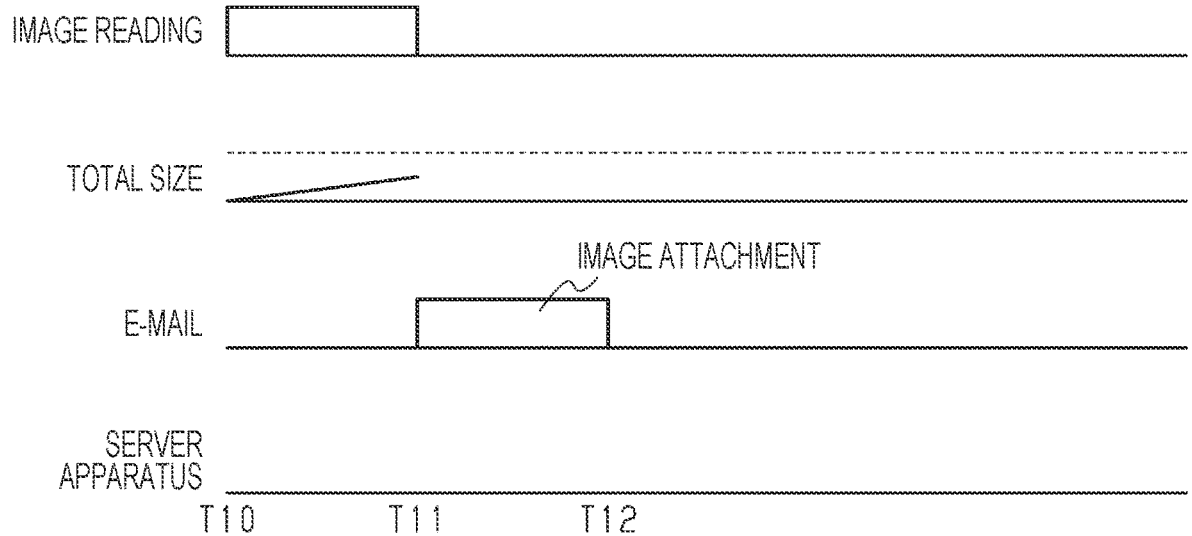
FIG. 5 is a timing chart showing image reading control.

Next, the operation of the image reading apparatus 11 will be described with reference to FIGS. 5 and 6. As shown in FIG. 5, when a job of reading an image from the document D at the timing indicated by reference numeral T10 and transferring the acquired image data by e-mail is input in the image reading apparatus 11, reading of the image is started, and the image reading is completed at the timing indicated by reference numeral T11. In this case, the total data size of the image data temporarily stored in the storage unit 61 does not exceed the transmission upper limit data size, the transmission of the e-mail with the image data is started from the timing indicated by reference numeral T11, and the transmission of the e-mail is completed at the timing indicated by reference numeral T12.

Figure 6:
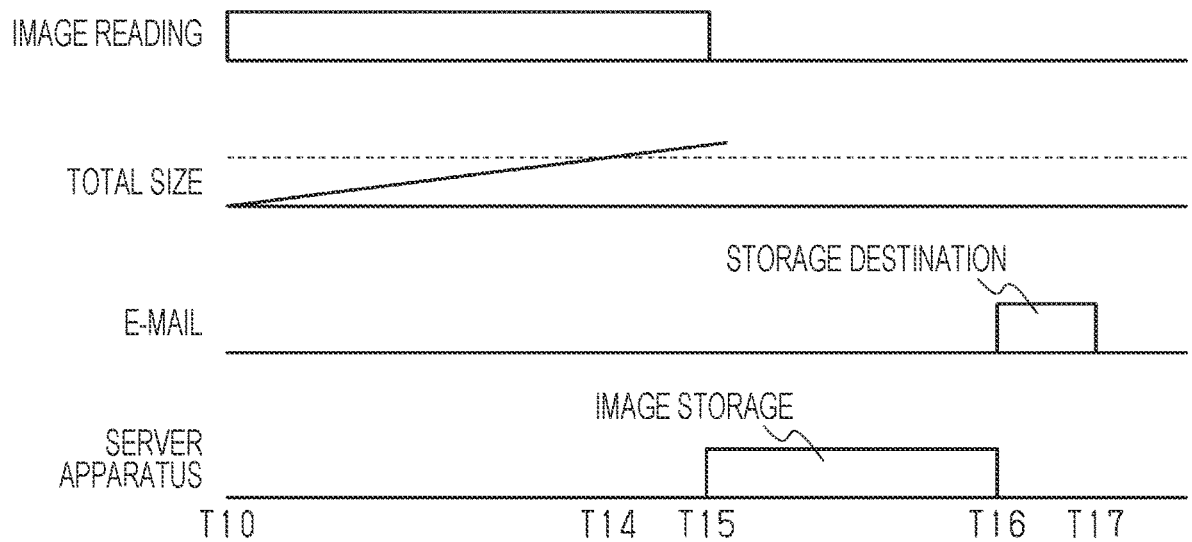
FIG. 6 is a timing chart showing image reading control.

On the other hand, as shown in FIG. 6, the image reading apparatus 11 finishes reading the image at the timing indicated by reference numeral T15. In this case, the total data size of the image data temporarily stored in the storage unit 61 exceeds the transmission upper limit data size at the timing indicated by reference numeral 114, the transmission of the image data to the cloud server apparatus 200 is started from the timing indicated by reference numeral T15, and the transmission of the image data is completed at the timing indicated by reference numeral T16. Then, when the storage completion information is received, the transmission of an e-mail indicating the storage destination of the image data and the one-time password included in the storage completion information is started, and the transmission of the e-mail is completed at the timing indicated by reference numeral T17.

As described in detail above, according to the present embodiment, the following effects can be obtained.

(1) When the data size of the image data acquired by reading the image from the document D does not exceed the transmission upper limit data size, an e-mail with the acquired image data can be transmitted to the specified transmission destination. Therefore, for example, regardless of whether the image reading apparatus 11 is connected to the host device 100 or not, the image data can be provided by transmitting the e-mail with the image data. When the data size of the acquired image data exceeds the transmission upper limit data size, the acquired image data can be stored in the cloud server apparatus 200. Therefore, even when it is not possible to transmit the e-mail with the acquired image data, it is possible to increase certainty of providing the acquired image data to the user at a specified transmission destination.

(2) Also, when the data size of the acquired image data exceeds the transmission upper limit data size, it is possible notify the user who has received the e-mail of the storage destination of the image data in the cloud server apparatus 200 by transmitting, to the specified transmission destination, an e-mail indicating the storage destination when the image data is stored in the cloud server apparatus 200.

(3) After the image data stored in the storage unit 61 is stored in the cloud server apparatus 200, the image data stored in the cloud server apparatus 200 is deleted from the storage unit 61. Therefore, even when the storage upper limit data size within which the data can be stored in the storage unit 61 is small, an area within which the image data can be stored can be secured in the storage unit 61.

(4) The acquired image data can be stored in the cloud server apparatus 200 by communicating with the cloud server apparatus 200 via the network NT, which is a wide area communication network. For this reason, the image data can also be provided to the terminal device 220 that can be connected to the cloud server apparatus 200 via the wide area communication network, and the acquired image data can be stored in the cloud server apparatus 200 without being aware of the storage destination for the cloud server apparatus 200 by using cloud computing.

(5) After reading the images from all the documents, it is possible to determine whether the total data size of the image data of all the documents exceeds the transmission upper limit data size, so that, for example, it is possible to prevent the image reading from being suspended before the images are read from all the documents.

(6) After the cloud server apparatus 200 transmits the image data stored in the storage unit 202 to the terminal device 220, the image data is deleted from the storage unit 202. Therefore, it is possible to secure an area in which the image data can be stored.

(7) A one-time password is used for the cloud server apparatus 200 to transmit the image data, and the image reading apparatus 11 transmits, to the specified transmission destination, an e-mail indicating the storage destination when the image data is stored in the storage unit 202 of the cloud server apparatus 200, and the one-time password. For this reason, the security of the cloud server apparatus 200 can be improved by using the one-time password, and the area where image data can be stored can be quickly secured by deleting the image data from the storage unit 202 when the image data stored in the storage unit 202 being transmitted once.

Second Embodiment

Next, the second embodiment will be described with reference to FIGS. 7 and 8. In the first embodiment, when reading of the images from all the document D is completed with the input of the job including the setting condition that the transfer method is the e-mail transfer, the controller 50 (determination unit 74) determined whether the total data size exceeded the transmission upper limit data size, but the present disclosure is not limited to this. For example, in the second embodiment, the controller 50 (determination unit 74) may determine whether the total data size exceeds the transmission upper limit data size every time reading of the image from one document D is completed with the input of the job. In the second embodiment, description different from that in the first embodiment will be mainly described, and description similar to that in the first embodiment will be omitted.

Figure 7:
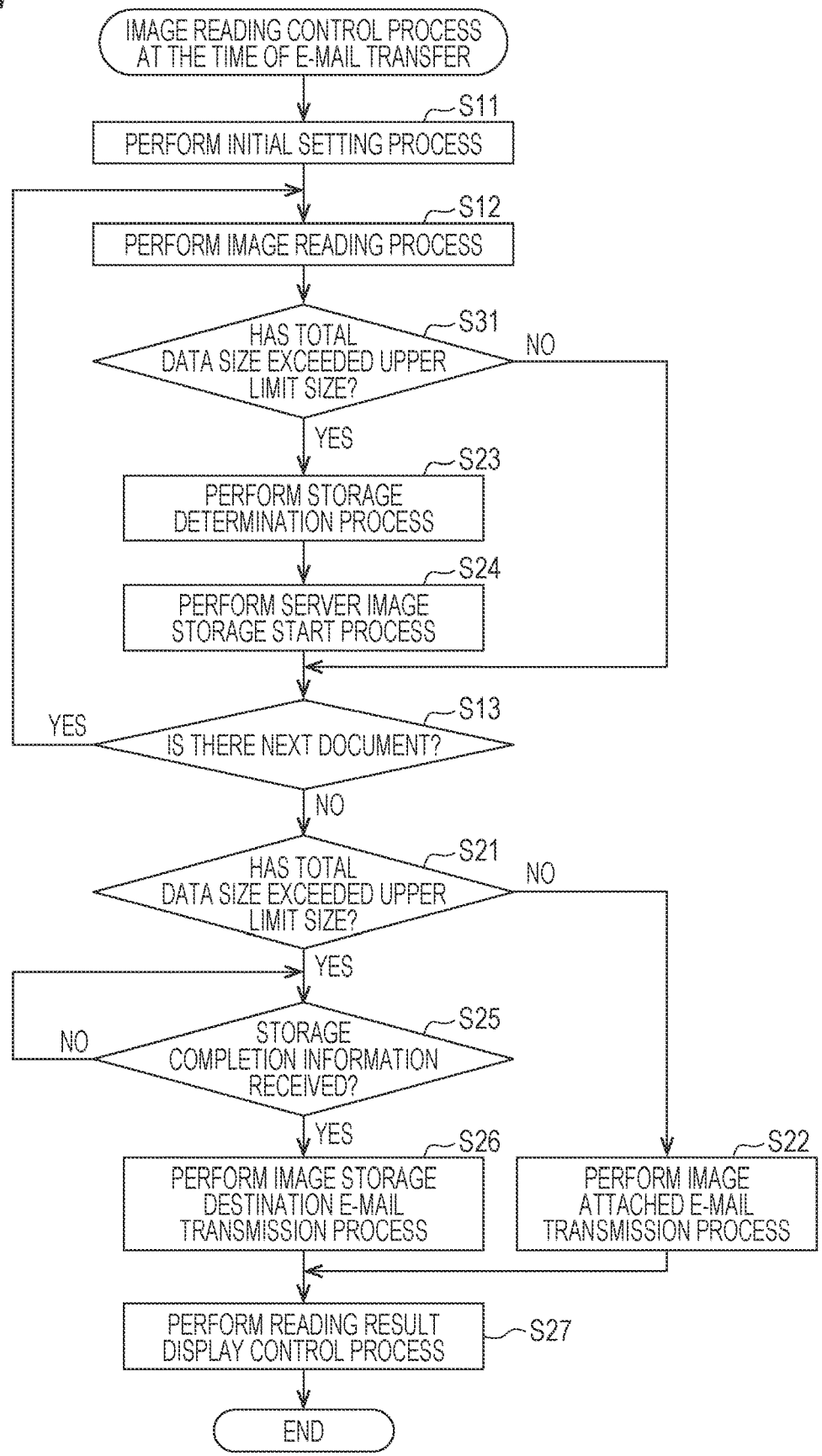
FIG. 7 is a flowchart showing an image reading control process at the time of e-mail transfer.
Figure 8:
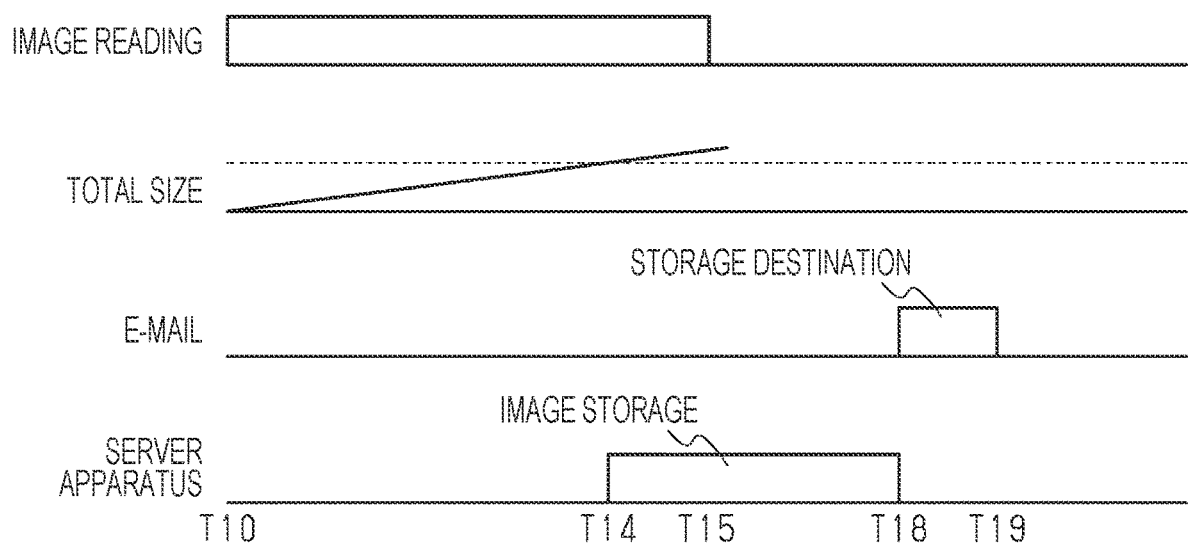
FIG. 8 is a timing chart showing image reading control.

As shown in FIG. 7, in the second embodiment, in step S12, when the reading unit 40 finishes the image reading process, for one sheet, for reading the image of the document D, the controller 50 advances the process to step S31. In step S31, as in step S21 shown in FIG. 4, the controller 50 specifies the total data size of the image data that is acquired by causing the reading unit 40 to read the image after the job is input to be stored in the storage unit 61, and determines whether the total data size exceeds the transmission upper limit data size. Specifically, after the image is read from the document D in step S12, the controller 50 determines whether the total data size of the image data stored in the storage unit 61 after the job is input exceeds the transmission upper limit data size. In such a process is performed even when the document D is placed on the document support 13 and the remaining document D is present, or even when, the document D is not placed on the document support 13 and no remaining document D is present.

When the controller 50 determines that the total data size does not exceed the transmission upper limit data size, the controller 50 advances the process to step S13 without performing steps S23 and S24. On the other hand, when the controller 50 determines that the total data size exceeds the transmission upper limit data size, the controller 50 advances the process to step S23, performs steps S23 and S24, and advances the process to step S13. In the present embodiment, in step S31, only when the controller 50 first determines that the total data size exceeds the transmission upper limit data size, the controller 50 sets a value indicating the cloud server apparatus 200 in the storage destination flag assigned to the storage unit 61, and the process proceeds to step S23. This storage destination flag is a flag that specifies the storage destination of the image data, and in the present embodiment, a value indicating the storage unit 61 and a value indicating the cloud server apparatus 200 can be set, but the present disclosure is limited to this. After that, a value indicating the cloud server apparatus 200 is set in the storage destination flag, and the controller 50 dose not determine that the total data size exceeds the transmission upper limit data size, does not perform steps S23 and S24, and the process proceeds to step S13.

In this way, when causing the reading unit 40 to read images from a plurality of documents D in response to a job input, the controller 50 (determination unit 74) determines, every time an image is read from one document D by the reading unit 40, whether the total data size of the image data of all the documents from the initial document to the current document acquired by reading the image by the reading unit 40 exceeds the transmission upper limit data size. Such processing corresponds to an example of a determination step. Then, when the controller 50 determines that the total data size exceeds the transmission upper limit data size, the controller 50 switches to the process of storing the image data in the cloud server apparatus 200.

Further, in the present embodiment, when the controller 50 determines that the total data size exceeds the transmission upper limit data size, the controller 50 transfers the image data to the cloud server apparatus 200 and reads the image in parallel.

Specifically, in step S24, the controller 50 starts to store the image data stored in the storage unit 61 in the cloud server apparatus 200. In this case, the controller 50 transmits, to the cloud server apparatus 200, the image data stored in the storage unit 61 in the order in which the documents are read from the image data acquired by reading the initial document D, and stores the transmitted image data in the storage unit 202 of the cloud server apparatus 200. Further, the controller 50 stores the image data in the cloud server apparatus 200 in a process different from the image reading process at the time of e-mail transfer.

After starting the transmission of image data to the cloud server apparatus 200 in step S24, the controller 50 advances the process to step S13 even when the transmission continues. When it is determined that the next document D is present, the controller 50 advances the process to step S12, reads an image from the next document D, and temporarily store the image data acquired by reading this image in the storage unit 61.

Further, the controller 50 waits for the image data when there is no image data which has not been transmitted to the cloud server apparatus 200 of the image data acquired by reading the image by the reading unit 40. Then, when the controller 50 temporarily stores, in the storage unit 61, the image data acquired by reading the image by the reading unit 40 in step S12, the controller 50 transmits the stored image data to the cloud server apparatus 200 to store the transmitted image data in the cloud server apparatus 200.

In this way, when the controller 50 determines that the total data size exceeds the transmission upper limit data size, the controller 50 stores the image data in the cloud server apparatus 200 and reads the image in parallel without suspending reading of the image.

When the controller 50 determines in step S13 that there is no next document D, the process proceeds to step S21. When the controller 50 determines in step S21 that the total data size does not exceed the transmission upper limit data size, the controller 50 advances the process to step S22. On the other hand, when the controller 50 determines that the total data size exceeds the transmission upper limit data size, the controller 50 advances the process to step S25.

Next, the operation of the image reading apparatus 11 will be described with reference to FIG. 8. As shown in FIG. 8, the total data size of the image data temporarily stored in the storage unit 61 exceeds the transmission upper limit data size at the timing indicated by reference numeral t14, the transmission of image data to the cloud server apparatus 200 is started from the timing indicated by reference numeral t14, and the transmission of the image data is completed at the timing indicated by reference numeral T18. Then, when the storage completion information is received, the transmission of an e-mail indicating the storage destination of the image data and the one-time password included in the storage completion information is started, and the transmission of the e-mail is completed at the timing indicated by reference numeral T19.

As described in detail above, according to the present embodiment, the following effects can be obtained.

(8) It is possible to determine, every time an image is read from one document D, whether the total data size of the image data of all the documents D from the initial document D to the current document D acquired by reading the image from the document D exceeds the upper limit data size, and it is possible to increase the frequency of determining whether the total data size of the image data exceeds the upper limit data size.

Third Embodiment

Next, the third embodiment will be described with reference to FIGS. 9 to 11. In the first embodiment and the second embodiment, when the total data size of the acquired image data exceeds the transmission upper limit data size, the image data is stored in the cloud server apparatus 200, but the present disclosure is not limited to this. For example, after the acquired image data is stored in the cloud server apparatus 200, an e-mail with image data may be transmitted when the total data size of the acquired image data does not exceed the transmission upper limit data size, while an e-mail indicating the storage destination of the image data may be transmitted when the total data size exceeds the transmission upper limit data size. In the third embodiment, description different from that in the first embodiment will be mainly described, and description similar to that in the first embodiment will be omitted.

Figure 9:
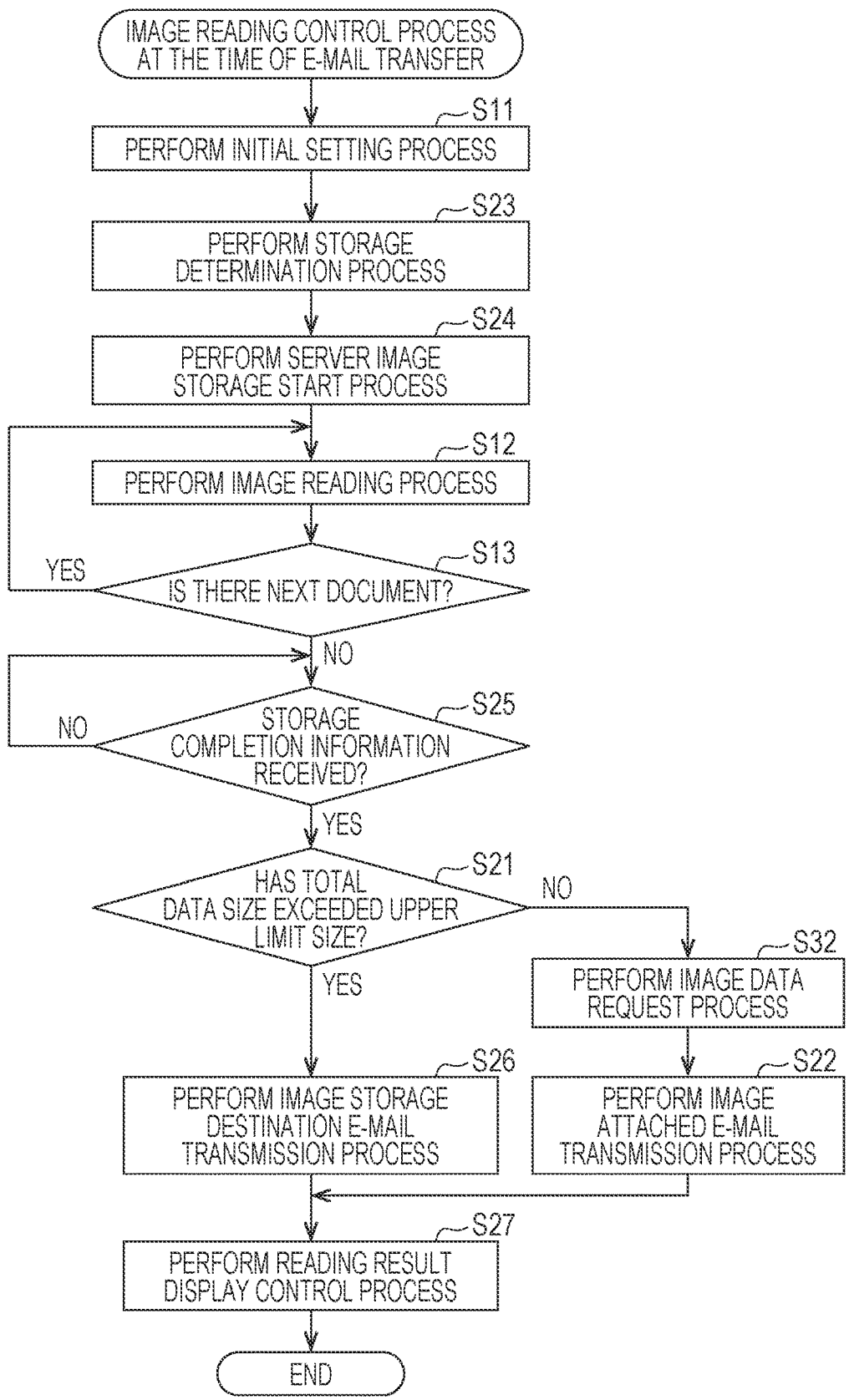
FIG. 9 is a flowchart showing an image reading control process at the time of e-mail transfer.
Figure 10:
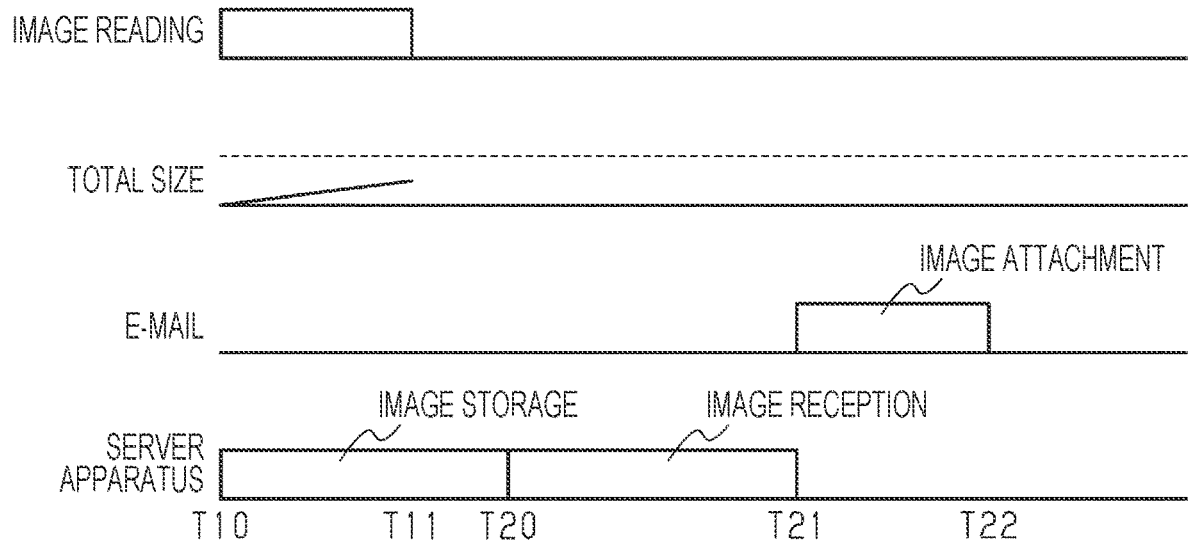
FIG. 10 is a timing chart showing image reading control.

As shown in FIG. 9, in the third embodiment, when step S11 ends, the controller 50 performs steps S23 and S24, and advances the process to steps S12 and S13. In step S24, the controller 50 starts to store the image data stored in the storage unit 61 in the cloud server apparatus 200. However, the controller 50 waits for the storage of the image data until the reading of the image by the reading unit 40 is started and the image data is acquired (until the acquired image data is stored in the storage unit 61), and waits for the image data. Then, when the controller 50 temporarily stores, in the storage unit 61, the image data acquired by reading the image by the reading unit 40 in step S12, the controller 50 starts transmission of the stored image data to the cloud server apparatus 200 in step S24 to store the transmitted image data in the storage unit 202 of the cloud server apparatus 200. In this way, the controller 50 can store the image data acquired by reading the image by the reading unit 40 in the cloud server apparatus 200. Such a process corresponds to an example of a storage step.

When the controller 50 determines in step S13 that there is no next document D, the process proceeds to step S25. In step S25, when the controller 50 determines that the storage completion information is received from the cloud server apparatus 200, the controller 50 advances the process to step S21. In step S21, when the controller 50 determines that the total data size of the image data acquired by reading the image by the reading unit 40 and stored in the storage unit 61 exceeds the transmission upper limit data size, the process proceeds to step S26. On the other hand, when the controller 50 determines that the total data size of the image data stored in the storage unit 61 does not exceed the transmission upper limit data size, the process proceeds to step S32.

In step S32, the controller 50 performs the image data request process. In this process, the controller 50 identifies the storage destination of the image data and the one-time password from the storage completion information, and then transmits, to the cloud server apparatus 200, the image data request information requesting the download of the image data based on the image data storage destination and the one-time password.

Further, in the present embodiment, when the cloud server apparatus 200 receives the image data request information from the image reading apparatus 11, the controller 201 determines that the download request is allowed as in the case where receiving the image data request information from the terminal device 220.

When the controller 201 determines that the download request is allowed, the controller 201 starts to transmit the image data to the image reading apparatus 11. When the transmission of the image data to the image reading apparatus 11 is completed, the controller 201 deletes, from the storage unit 202, the image data whose transmission is completed, while deletes, from the image data management database of the storage unit 202, the combination of the storage destination of the image data whose transmission is completed and the one-time password. By deleting, from the storage unit 202, the image data transmitted to the image reading apparatus 11 in this way, it is possible to secure the storage capacity, of the image data, that can be stored in the storage unit 202.

After downloading the image data to the image reading apparatus 11, the controller 50 attaches the downloaded image data to an e-mail in step S22, and transmit the e-mail with the image data to the e-mail server apparatus 210 via the network NT with the e-mail address included in the job as the transmission destination.

In this way, when the data size of the image data acquired by reading the image by the reading unit 40 does not exceed the transmission upper limit data size, the controller 50 downloads the image data acquired by reading the image by the reading unit 40 and stored in the cloud server apparatus 200 and transmits an e-mail with the downloaded image data to the specified transmission destination. On the other hand, when the data size of the image data acquired by reading the image by the reading unit 40 exceeds the transmission upper limit data size, the controller 50 transmits, to the specified transmission destination, the e-mail indicating the storage destination when the image data is stored in the cloud server apparatus 200.

Next, the operation of the image reading apparatus 11 will be described with reference to FIGS. 10 and 11. As shown in FIG. 10, when the image reading apparatus 11 starts to read the image at the timing indicated by reference numeral T10, the transmission of the image data acquired by reading the image to the cloud server apparatus 200 is started. Then, at the timing indicated by reference numeral T20, the transmission of the image data to the cloud server apparatus 200 is completed. In this case, the total data size of the image data stored in the storage unit 61 does not exceed the transmission upper limit data size, the download of image data from the cloud server apparatus 200 to the image reading apparatus 11 is started in response to the request for image data to the cloud server apparatus 200, and the download of the image data is completed at the timing indicated by reference numeral T21. Then, the transmission of the e-mail with the downloaded image data is started at the timing indicated by reference numeral T21, and the transmission of the e-mail is completed at the timing indicated by reference numeral T22.

Figure 11:
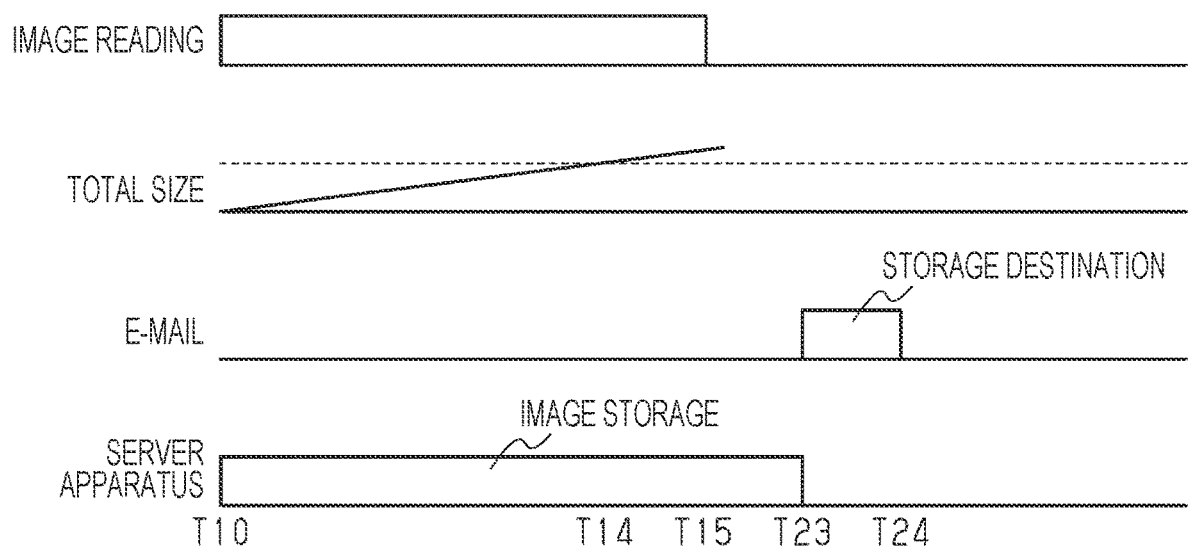
FIG. 11 is a timing chart showing image reading control.

On the other hand, as shown in FIG. 11, when the image reading apparatus 11 starts to read the image, the transmission of the image data acquired by reading the image to the cloud server apparatus 200 is started. Then, at the timing indicated by reference numeral T23, the transmission of the image data to the cloud server apparatus 200 is completed. In this case, the total data size of the image data stored in the storage unit 61 exceeds the transmission upper limit data size at the timing indicated by reference numeral T14, and when the storage completion information is received at the timing indicated by reference numeral T23, the transmission of an e-mail indicating the storage destination of the image data and the one-time password included in the storage completion information is started. Then, the transmission of the e-mail is completed at the timing indicated by reference numeral T24. In the present embodiment, the controller 50 determines the total data size when the image data acquired by reading the image by the reading unit 40 is stored in the storage unit 61, but present disclosure is not limited to this. For example, the controller 50 may determine the total data size when the image data acquired by reading the image by the reading unit 40 is transmitted to the cloud server apparatus 200.

As described in detail above, according to the present embodiment, the following effects can be obtained.

(9) The image data acquired by reading the image from the document D can be stored in the cloud server apparatus 200. When the data size of the acquired image data does not exceed the transmission upper limit data size, the image data can be stored in the cloud server apparatus 200, and the e-mail with the image data downloaded from the cloud server apparatus 200 can be transmitted to the specified transmission destination. On the other hand, when the data size of the acquired image data exceeds the transmission upper limit data size, it is possible to transmit, to the specified transmission destination, the e-mail indicating the storage destination when the image data is stored in the cloud server apparatus 200. Therefore, even when it is not possible to transmit the e-mail with the acquired image data, it is possible to increase certainty of providing the acquired image data to the user at a specified transmission destination.

Fourth Embodiment

Next, the fourth embodiment will be described. In the first to third embodiments, when the total data size of the acquired image data exceeds the transmission upper limit data size, the image data is stored in the cloud server apparatus 200, but the present disclosure is not limited to this. For example, in the fourth embodiment, when the total data size of the acquired image data exceeds the storage upper limit data size, the image data is stored in the cloud server apparatus 200, but the present disclosure is not limited to this. In the fourth embodiment, description different from that in the second embodiment will be mainly described, and description similar to that in the second embodiment will be omitted.

In the fourth embodiment, in step S31 shown in FIG. 7, the controller 50 specifies the total data size of the image data that is acquired by causing the reading unit 40 to read the image after the job is input to be stored in the storage unit 61. When the controller 50 stores the image data acquired by reading the image from the next document D in the storage unit 61, the controller 50 determines whether the total data size of the image data stored in the storage unit 61 exceeds the storage upper limit data size as an example of the upper limit data size.

In the present embodiment, the controller 50 detects the presence or absence of the document D placed on the document support 13 based on the detection signal from the document sensor 45. When the controller 50 determines that no next document D is present, the controller 50 stores the image data acquired by reading the image from the next document D in the storage unit 61, thereby determining that the total data size of the image data stored in the storage unit 61 does not exceed the storage upper limit data size.

When the controller 50 determines that the next document D is present, the controller 50 calculates, as the unit data size, the maximum data size of the image data acquired by reading the image from one document D based on, for example, the setting conditions included in the job such as reading resolution, reading color, single-sided reading/double-sided reading, and the like, and, for example, the maximum document size of the document D, such as A4, that the image reading apparatus 11 can read. The controller 50 determines whether the predicted total data size acquired by adding the total data size of the specified image data to the calculated unit data size exceeds the storage upper limit data size.

When the controller 50 determines that the total data size does not exceed the storage upper limit data size in a case where the controller 50 stores the image data acquired by reading the image from the next document D in the storage unit 61, the controller 50 advances the process to step S13 without performing steps S23 and S24. On the other hand, when the controller 50 determines that the total data size exceeds the storage upper limit data size in a case where the controller 50 stores the image data acquired by reading the image from the next document D in the storage unit 61, the controller 50 advances the process to step S23, performs steps S23 and S24, and advances the process to step S13. In this case, in step S24, the controller 50 stores the image data in the cloud server apparatus 200 and reads the image in parallel without suspending the reading of the image, as in the second embodiment, but the present disclosure is not limited to this.

For example, in a case where when the controller 50 stores, in the storage unit 61, the image data acquired by reading the image by the reading unit 40, the data size of the image data stored in the storage unit 61 exceeds the storage upper limit data size, the controller 50 may suspend reading of the image by the reading unit 40, and may store, in the cloud server apparatus 200, the image data stored in the storage unit 61. The controller 50 may store the image data in the cloud server apparatus 200 and delete the image data stored in the cloud server apparatus 200 from the storage unit 61. As a result, the image data stored in the storage unit 61 can be stored in the cloud server apparatus 200, and since the image data is stored in the cloud server apparatus 200, and the image data stored in the cloud server apparatus 200 is deleted from the storage unit 61, an area for storing the next and subsequent image data can be secured in the storage unit 61.

Further, for example, in a case where when the controller 50 stores, in the storage unit 61, the image data acquired by reading the image by the reading unit 40, the data size of the image data stored in the storage unit 61 exceeds the storage upper limit data size, the controller 50 may store the acquired image data itself in the cloud server apparatus 200 without suspending reading of the image. That is, when the controller 50 determines that the data size of the image data exceeds the storage upper limit data size, the controller 50 switches the storage destination of the image data read by the reading unit 40 from the next document from the storage unit 61 to the cloud server apparatus 200. After reading of the images from all the documents D is completed, the controller 50 stores, in the cloud server apparatus 200, the image data stored in the storage unit 61 before the storage destination is switched from the storage unit 61 to the cloud server apparatus 200. On the other hand, the controller 201 may combine the image data transmitted from the image reading apparatus 11 in the cloud server apparatus 200. Specifically, when the storage destination is switched from the storage unit 61 to the cloud server apparatus 200, the controller 50 may combine image data, from the document from the middle, stored in the cloud server apparatus 200 with image data, from the initial document to the middle document, stored in the cloud server apparatus 200 as one piece of image data in the reading order from the initial document. As a result, the image data acquired by reading the images from the next and subsequent documents D, and the image data acquired so far and stored in the storage unit 61 are stored in the cloud server apparatus 200, and can be combined in the cloud server apparatus 200, so that the configuration is simple.

Returning to the explanation of the fourth embodiment, as in step S31, when the controller 50 determines, in step S21, that the total data size does not exceed the storage upper limit data size in a case where the controller 50 stores the image data acquired by reading the image from the next document D in the storage unit 61, the controller 50 advances the process to step S22. On the other hand, when the controller 50 determines that the total data size exceeds the storage upper limit data size in a case where the controller 50 stores the image data acquired by reading the image from the next document D in the storage unit 61, the controller 50 advances the process to step S23, performs steps S23 and S24, and advances the process to step S13.

In the present embodiment, the storage upper limit data size is defined as a data size smaller than the transmission upper limit data size. In this way, since the storage upper limit data size is defined as a data size smaller than the transmission upper limit data size, when the total data size of the image data acquired from all the documents D does not exceed the storage upper limit data size, the total data size does not exceed the transmission upper limit data size larger than the storage upper limit data size. Therefore, in step S22, the controller 50 can transmit, to the specified transmission destination, an e-mail with the image data acquired by reading the image by the reading unit 40 and stored in the storage unit 61.

In the present embodiment, although the storage upper limit data size is defined as a data size smaller than the transmission upper limit data size, the present disclosure is not limited to this. For example, the storage upper limit data size may be defined as the same data size as the transmission upper limit data size, or may be defined as a data size larger than the transmission upper limit data size, or the transmission upper limit data size does not have to be defined. Further, the storage upper limit data size is not a constant data size, but may be dynamically changed according to the usage status of the storage unit 61 depending on the occasion. In addition, in a configuration in which the storage upper limit data size can be a data size larger than the transmission upper limit data size, the process of step S31 may be a determination process including a first determination process of determining whether the total data size exceeds the storage upper limit data size, and a second determination process of determining whether the total data size exceeds the transmission upper limit data size. In this case, the controller 50 may be configured to advance the process to step S23 when one of the first determination process and the second determination process is an affirmative determination.

As described in detail above, according to the present embodiment, the following effects can be obtained.

(10) In a case where when the image data acquired by reading the image from the next and subsequent documents D is stored in the storage unit 61, the total data size of the image data stored in the storage unit 61 exceeds the storage upper limit data size, the image data can be stored in the cloud server apparatus 200, so that it is possible to suppress an increase in the data size of the image data stored in the storage unit 61. Therefore, for example, even when the free capacity of the storage unit 61 is small, all the documents D can be read by the reading unit 40. For example, when the data size of the image data acquired by reading all the documents D is equal to or less than the transmission upper limit data size, it is possible to transmit, to a specified transmission destination, an e-mail with one piece of image data acquired by reading all the documents D. Further, for example, when the data size of the image data acquired by reading all the documents D exceeds the transmission upper limit data size, one piece of image data acquired by reading all the documents D can be stored in the cloud server apparatus 200, and an e-mail indicating the storage destination of the cloud server apparatus 200 can be transmitted to a specified transmission destination.

The above embodiment can also be changed to a form such as the modification shown below. Further, a combination of the above embodiment and the modifications shown below may be a further modification example, or a combination of the modifications shown below may be a further modification.

In the fourth embodiment, the maximum data size of the image data acquired by reading the image from one document D is calculated as the unit data size, but the present disclosure is not limited to this, and for example, the unit data size is stored in the storage unit 61 in advance. In this case, the maximum data size of the image data acquired by reading the image from one document D is stored in the storage unit 61 as the unit data size based on the setting condition and the maximum document size of the document D.

In the initial setting process (step S11) of the image reading process at the time of e-mail transfer, the valid period (upper limit period in which the data can be stored, the period until the data is deleted) of the image data stored in the cloud server apparatus 200 may be initialized. Specifically, the valid period may be a valid period after the image data is stored in the cloud server apparatus 200. In this case, even when the image data stored in the cloud server apparatus 200 is not downloaded, the image data is deleted when the valid period elapses after the image data is stored in the cloud server apparatus 200, so that the area where image data can be stored can be quickly secured. Further, for example, the valid period may be a valid period after the image data is downloaded from the cloud server apparatus 200. Further, for example, the valid period of the image data may be set according to the user's input, not by the initial setting process, but by another condition, or may be set in the cloud server apparatus 200 regardless of the user's input.

In the initial setting process (step S11) of the image reading process at the time of e-mail transfer, the processing content when the data size of the image data exceeds the upper limit data size may be initialized. The specific processing contents include storing the image data in the cloud server apparatus 200, transmitting an e-mail with the divided image data to a specified transmission destination for each of the divided image data acquired by dividing the image data, or not performing these processes. In the initial setting process, the controller 50 selects the processing content included in the job from a plurality of types of processing contents. The processing content included in the job is set according to the user's input. In this way, when the data size of the image data exceeds the upper limit data size, the controller 50 can select, according to the input by the user, either to store the acquired image data in the cloud server apparatus 200 or to transmit, to a specified transmission destination, an e-mail with the divided image data acquired by dividing the image data. As a result, when the total data size of the image data exceeds the upper limit data size, it is possible to select, according to the input by the user, either to store the image data in the cloud server apparatus 200 or to transmit, to a specified transmission destination, an e-mail with the divided image data acquired by dividing the image data to perform control as the user intends. Further, for example, such a selection process may not be set by an initial setting process, but may be set according to a user's input triggered by another condition such as a determination being made when the data size of the image data exceeds the upper limit data size.

Figure 12:
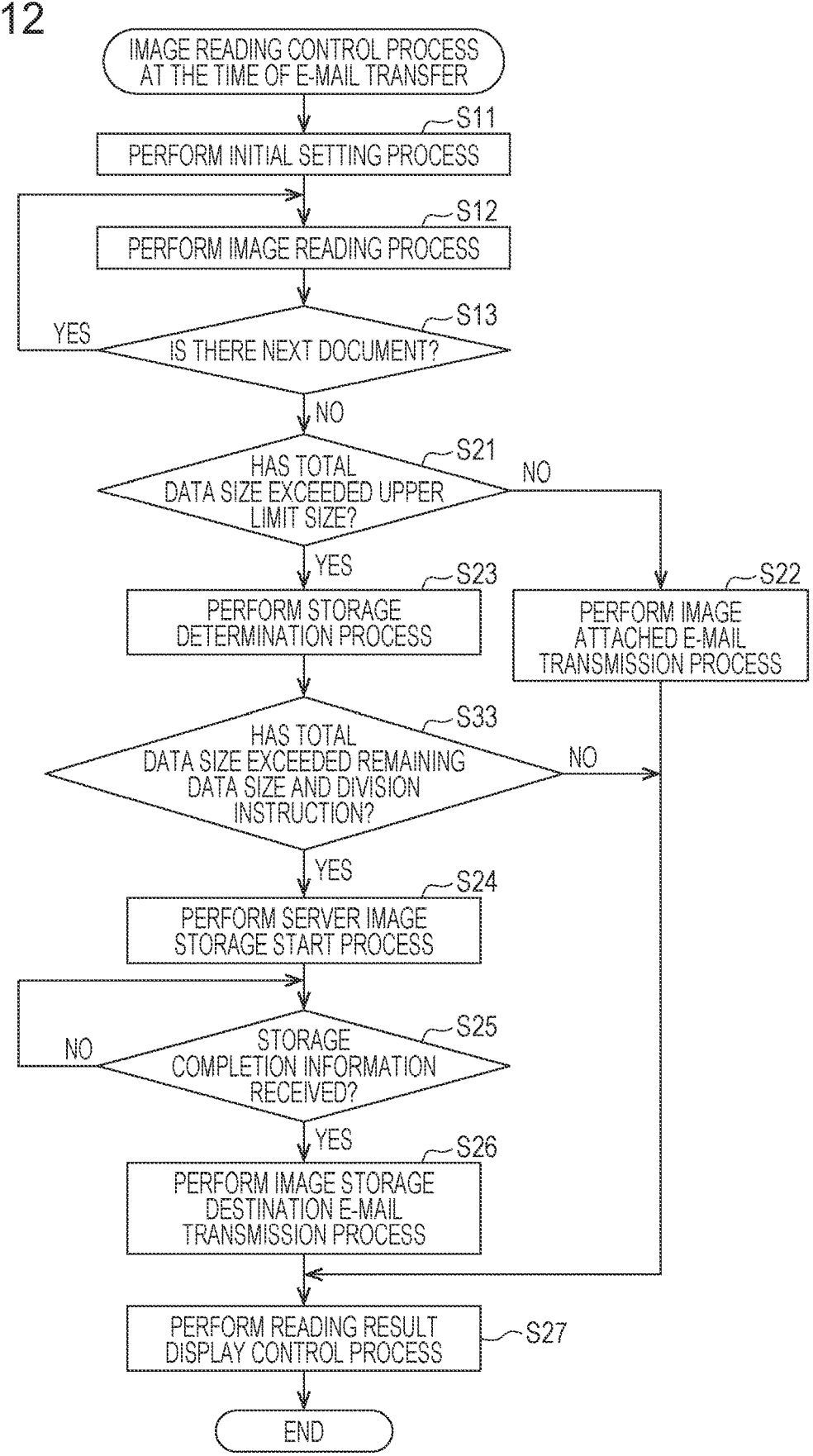
FIG. 12 is a flowchart showing an image reading control process at the time of e-mail transfer.

The cloud server apparatus 200 may define an upper limit data size within which the image data can be stored for each image reading apparatus 11. Specifically, when the cloud server apparatus 200 receives the storage request information from the image reading apparatus 11 via the network NT, the controller 201 refers to the user registration database stored in the storage unit 202, and reads the remaining data size when information that matches the apparatus identification information included in the storage request information is registered. The remaining data size is a data size in which the image data can be stored, and is managed for each piece of the apparatus identification information. When the remaining data size is "0", the controller 201 determines that the storage allowable condition is not satisfied. When the remaining data size is not "0", the controller 201 determines that the storage allowable condition is satisfied, and transmits, to the image reading apparatus 11, the storage allowable information including the remaining data size. In step S23 shown in FIG. 12, when the controller 50 receives the storage allowable information from the cloud server apparatus 200, the controller 50 determines that the storage of the image data is allowed, and specifies the remaining data size as an example of the upper limit data size from the storage allowable information. Then, in step S33 shown in FIG. 12, the controller 50 specifies the total data size of the image data stored in the storage unit 61, and determines whether the total data size exceeds the remaining data size. When the controller 50 determines that the total data size of the image data does not exceed the remaining data size, the process proceeds to step S24. In step S24, the controller 50 transmits all the image data to the cloud server apparatus 200 to store the transmitted image data in the storage unit 202 of the cloud server apparatus 200. When the controller 50 determines that the total data size of the image data exceeds the remaining data size, the controller 50 causes the notification unit 27 to make notification indicating whether part of the image data is divided and stored in the cloud server apparatus 200. Then, when a division instruction for dividing part of the image data and storing it in the cloud server apparatus 200 according to the input from the operation unit 20 by the user is input, the controller 50 advances the process to step S24. Subsequently, in step S24, the controller 50 of all the image data, generates the image data that does not exceed the remaining data size in the reading order from the initial document D, transmits the image data to the cloud server apparatus 200, and stores the transmitted image data in the storage unit 202 of the cloud server apparatus 200. As described above, in step S24, the controller 50 transmits, to the cloud server apparatus 200, the image data with up to the remaining data size specified from the storage allowable information. On the other hand, when an instruction for not dividing part of the image data or storing it in the cloud server apparatus 200 according to the input from the operation unit 20 by the user is input, the controller 50 advances the process to step S27. In this case, in step S27, the controller 50 causes the notification unit 27 to make notification that the e-mail with the acquired image data cannot be transmitted or stored in the cloud server apparatus 200, and the image reading control process at the time of e-mail transfer is completed. Further, for example, such control can be applied not only to the first embodiment as described above, but also to the second to fourth embodiments. Specifically, the controller 50 may perform step S33 after the step S23 of FIG. 7 is completed in the second embodiment. In this case, the controller 50 performs control in the same manner as described above, but when it is determined that the total data size of the image data exceeds the remaining data size, and when the division instruction is input, the controller 50 may suspend reading of the image in step S24 after transmitting the image data that does not exceed the remaining data size to the cloud server apparatus 200. Further, the controller 50 may perform step S33 after the step S12 of FIG. 9 is completed in the third embodiment. In this case, the controller 50 performs control in the same manner as described above, but when it is determined that the total data size of the image data exceeds the remaining data size, and when the division instruction is input, the controller 50 may suspend reading of the image in step S24 after transmitting the image data that does not exceed the remaining data size to the cloud server apparatus 200. Further, for example, the controller 201 may perform control when the cloud server apparatus 200 has an upper limit data size capable of storing image data for each file instead of an upper limit data size capable of storing image data for each image reading apparatus 11. In this case, in the image reading apparatus 11, the controller 50 may divide all the image data into a plurality of files with up to the upper limit data size, transmit the image data divided into a plurality of files to the cloud server apparatus 200, and store the image data in the storage unit 202 of the cloud server apparatus 200.

The cloud server apparatus 200 may be composed of one or a plurality of server apparatuses. Specifically, the image reading apparatus 11 may be communicably connected to a first cloud server apparatus and a second cloud server apparatus via the network NT. Further, the plurality of cloud server apparatus may have a priority defined, and the first cloud server apparatus may be defined to have a higher priority than the second cloud server apparatus. In this case, in step S23, the controller 50 transmits the storage request information to the first cloud server apparatus in order of priority via the network NT. Then, when the controller 50 receives the storage allowable information from the first cloud server apparatus, the controller 50 specifies the remaining data size from the storage allowable information. In step S24, the controller 50 transmits, to the first cloud server apparatus, the image data with up to the remaining data size specified from the storage allowable information. Specifically, when the total data size of the image data exceeds the remaining data size, the controller 50 transmits, to the first cloud server apparatus, the image data with up to the remaining data size. For the remaining image data, the storage request information may be transmitted to the second cloud server apparatus in order of priority via the network NT. In this case, the controller 50 performs the process in the same manner as the communication with the first cloud server apparatus. In this way, the controller 50 can store the acquired image data separately in both the first cloud server apparatus and the second cloud server apparatus. The controller 50 transmits, to the specified transmission destination, an e-mail with the contents indicating a combination of a storage destination when the image data is stored in the first cloud server apparatus and a one-time password, and a combination of a storage destination when the image data is stored in the second cloud server apparatus and a one-time password. Further, for example, the first cloud server apparatus and the second cloud server apparatus each may be a server apparatus managed by the manufacturer that provides the image reading apparatus 11, or a server apparatus managed by a different organization from the manufacturer that provides the image reading apparatus 11. Further, for example, the storage unit 61 of the image reading apparatus 11 may store information (specifically, a communication destination or the like) for communicating with the cloud server apparatus managed by the manufacturer that provides the image reading apparatus 11, and can communicate with the cloud server apparatus by a simple input by the user such as a user registration.

The e-mail server apparatus 210 may be composed of one or a plurality of server apparatuses.

When the data size of the image data exceeds the upper limit data size, at least part of the image data acquired from all the documents D may be stored in the cloud server apparatus 200. In this case, an e-mail with the image data that does not exceed the transmission upper limit data size of the image data acquired from all documents D may be transmitted to the specified transmission destination, the remaining image data may be stored in the cloud server apparatus 200, and an e-mail indicating the storage destination of the image data may be transmitted to the specified transmission destination. Further, for example, software for combining the image data attached to the e-mail and the image data downloaded from the cloud server apparatus 200 may be downloaded to the terminal device 220.

When the data size of the image data exceeds the upper limit data size, an apparatus in which the image data is stored may not be a cloud server apparatus 200 that is communicably connected to the image reading apparatus 11 via a wide area communication network, but may be, for example, a server apparatus that is communicably connected to the image reading apparatus 11 via a premises communication network. Further, for example, the apparatus may be a storage medium that is directly communicatively connected to the image reading apparatus 11 or a host device 100. For example, it may be the storage unit 61 of the image reading apparatus 11 when the storage capacity of the storage unit 61 of the image reading apparatus 11 is large. Here, the upper limit data size may be, for example, a transmission upper limit data size or a storage upper limit data size.

In the third embodiment, when the total data size of the image data does not exceed the upper limit data size, the controller 50 downloads the image data stored in the cloud server apparatus 200 from the cloud server apparatus 200, and transmits an e-mail with the downloaded image data to the specified transmission destination, but the present disclosure is not limited to this. For example, the controller 50 may read the image data acquired by reading the image by the reading unit 40 from the storage unit 61, and transmit, to a specified transmission destination, an e-mail with the image data read from the storage unit 61. In other words, when the data size of the image data acquired by reading the image by the reading unit 40 does not exceed the upper limit data size, the controller 50 may transmit, to a specified transmission destination, an e-mail with the image data acquired by reading the image by the reading unit 40 and stored in the storage unit 61, or the image data stored in the cloud server apparatus 200.

The e-mail indicating the storage destination may be, for example, text information indicating the storage destination or code information such as a QR code (registered trademark). Also, for example, it is not necessary to use a one-time password.

The position where the document presence/absence sensor 46 is disposed may be a position where the presence/absence of the document D and the front and rear ends of the document D can be detected before the document D is discharged.

The power sources of the transport unit 31 and the discharge unit 32 is not limited to be common, but the transport unit 31 and the discharge unit 32 may be driven by respective power sources. For example, the power source of the transport unit 31 is a transport motor, and the power source of the discharge unit 32 is a discharge motor.

The image sensor is not limited to be a CMOS image sensor, but, for example, may be a metal oxide semiconductor (MOS) image sensor or a charge coupled device (CCD) image sensor.

The image sensor 42 is not limited to a linear image sensor, but may be an area image sensor.

Respective functional components in the computer 60 is not limited to software, but, for example, may be implemented by hardware using electronic circuits such as a field-programmable gate array (FPGA) and an application specific IC (ASIC), or may be implemented by the collaboration of software and hardware.

The material of the document is not limited to paper, but may be a resin film, a sheet, a woven fabric, a metal film, or the like.

The image reading apparatus may be part of a multifunction machine having a print function and a copying function in addition to the scanner function.

The image reading apparatus is not limited to be of a sheet feed type, but may be of a flatbed type. When the image reading apparatus is a flatbed type image reading apparatus, it includes, in the main body, a carriage that can move along the sub scanning direction (X direction). The carriage is moved powered by a scanning motor, and reads the image of the document set on the glass plate of the document tray with the light source and reading unit provided on the carriage. The above embodiment can be applied to even this type of flatbed type image reading apparatus as long as it is provided with an automatic document feeder (auto sheet feeder) that automatically feeds documents. Further, the above embodiment can be applied not only to the image reading apparatus but also to an image reading system including the image reading apparatus and the server apparatus, an image reading control method and a program in the image reading apparatus.

Hereinafter, the technical concept grasped from the above-described embodiments and modifications will be described together with the effects. The image reading apparatus includes a reading unit that reads an image from a document, and a controller that controls the reading unit, wherein the controller is configured to transmit, to a specified transmission destination, an e-mail with image data acquired by reading an image by the reading unit, and when a data size of the image data acquired by reading the image by the reading unit exceeds an upper limit data size, stores, in a server apparatus, at least part of the image data acquired by reading the image by the reading unit, and transmits, to a specified transmission destination, an e-mail indicating a storage destination when the image data is stored in the server apparatus.

According to this configuration, it is possible to transmit, to the specified transmission destination, an e-mail with image data acquired by reading the image from the document. On the other hand, when the data size of the acquired image data exceeds the upper limit data size, at least part of the acquired image data can be stored in the server apparatus. Therefore, it is possible to suppress a situation in which the acquired image data cannot be provided because the e-mail with the acquired image data cannot be transmitted, and it is possible to increase certainty of providing the acquired image data to the user. Also, when the data size of the acquired image data exceeds the upper limit data size, it is possible notify the user who has received the e-mail of the storage destination of the image data in the server apparatus by transmitting, to the specified transmission destination, an e-mail indicating the storage destination when the image data is stored in the server apparatus.

The image reading apparatus includes a reading unit that reads an image from a document, and a controller that controls the reading unit, wherein the controller is configured to store, in a server apparatus, at least part of image data acquired by reading an image by the reading unit, and transmits, to a specified transmission destination, an e-mail with the image data acquired by reading the image by the reading unit or the image data that is stored in the server apparatus when a data size of the image data acquired by reading the image by the reading unit does not exceed an upper limit data size, while transmits, to the specified transmission destination, an e-mail indicating a storage destination when the image data is stored in the server apparatus when the data size of the image data acquired by reading the image by the reading unit exceeds an upper limit data size.

According to this configuration, at least part of the image data acquired by reading the image from the document can be stored in the server apparatus. When the data size of the acquired image data does not exceed the upper limit data size, an e-mail with the acquired image data or the image data stored in the server apparatus can be transmitted to the specified transmission destination. On the other hand, when the data size of the acquired image data exceeds the upper limit data size, it is possible to transmit, to the specified transmission destination, the e-mail indicating the storage destination when the image data is stored in the server apparatus. Therefore, it is possible to suppress a situation in which the acquired image data cannot be provided because the e-mail with the acquired image data cannot be transmitted, and it is possible to increase certainty of providing the acquired image data to the user. Also, it is possible notify the user who has received the e-mail of the storage destination of the image data in the server apparatus by transmitting, to the specified transmission destination, an e-mail indicating the storage destination when the image data is stored in the server apparatus.

In the above image reading apparatus, the controller may store, in the server apparatus, the image data acquired by reading the image by the reading unit by using cloud computing through communicating with the server apparatus via a wide area communication network.

According to this configuration, by communicating with the server apparatus via the wide area communication network, it is possible to store the acquired image data in the server apparatus, and it is possible to provide the terminal device that can be connected to the server apparatus via the wide area communication network with the image data. It is possible to store the acquired image data in the server apparatus without being aware of the storage destination for the server apparatus by using cloud computing.

The above image reading apparatus may further include a transport mechanism that transports a plurality of documents one by one in order, wherein the controller may include a determination unit that determines, after causing the reading unit to read images from all documents, whether a total data size of image data of all the documents acquired by reading the images by the reading unit exceeds an upper limit data size.

According to this configuration, after reading the images from all the documents, it is possible to determine whether the total data size of the image data of all the documents exceeds the upper limit data size, so that, for example, it is possible to prevent the image reading from being suspended before the images are read from all the documents.

The above image reading apparatus may further include a transport mechanism that transports a plurality of documents one by one in order, wherein when causing the reading unit to read images from the plurality of documents, the controller may include a determination unit that determines, every time an image is read from one document by the reading unit, whether a total data size of image data of all documents from an initial document to a current document acquired by reading images by the reading unit exceeds an upper limit data size.

According to this configuration, it is possible to determine, every time an image is read from one document, whether the total data size of the image data of all the documents from the initial document to the current document acquired by reading the image from the document exceeds the upper limit data size, and it is possible to increase the frequency of determining whether the total data size of the image data exceeds the upper limit data size.

In the above image reading apparatus, the controller may include a storage unit that temporarily stores data, with up to a predetermined data size, including at least image data acquired by reading an image by the reading unit, and in a case where when image data acquired by reading an image by the reading unit is stored in the storage unit, a data size of the image data stored in the storage unit exceeds a predetermined data size, may suspend reading of the image by the reading unit, may store, in the server apparatus, at least part of the image data stored in the storage unit, and may delete, from the storage unit, the image data which is stored in the server apparatus.

According to this configuration, in a case where when the image data acquired by reading the image from the document is temporarily stored in the storage unit, the data size of the image data stored in the storage unit exceeds the predetermined data size as an upper limit, the controller suspends reading of the image, and stores, in the server apparatus, at least part of the image data stored in the storage unit. An area for storing the acquired image data can be secured in the storage unit by deleting the image data stored in the server apparatus from the storage unit.

In the above image reading apparatus, the controller may include a storage unit that temporarily stores data, with up to a predetermined data size, including at least image data acquired by reading an image by the reading unit, and in a case where when image data acquired by reading an image by the reading unit is stored in the storage unit, a data size of the image data stored in the storage unit exceeds a predetermined data size, may store the image data in the server apparatus.

According to this configuration, in a case where when the image data acquired by reading the image from the document is temporarily stored in the storage unit, the data size of the image data stored in the storage unit exceeds the predetermined data size as an upper limit, the image data can be stored in the server apparatus, so that it is possible to suppress an increase in the data size of the image data stored in the storage unit.

In the above image reading apparatus, the controller may include a storage unit that temporarily stores data, with up to a predetermined data size, including at least image data acquired by reading an image by the reading unit, and in a case where when image data acquired by reading an image by the reading unit is stored in the storage unit, a data size of the image data stored in the storage unit exceeds a predetermined data size, may be configured to select, according to an input by a user, either to store, in the server apparatus, at least part of the image data acquired by reading the image by the reading unit, or to transmit, to a specified transmission destination, an e-mail with divided image data acquired by dividing the image data stored in the storage unit.

According to this configuration, in a case where when the acquired image data is temporarily stored in the storage unit, the data size of the data stored in the storage unit exceeds the predetermined data size, it is possible to select, according to an input by the user, either to store at least part of the image data in the server apparatus or to transmit, to the specified transmission destination, an e-mail with the divided image data acquired by dividing the image data. Therefore, it is possible to perform control as the user intends.

The image reading system includes an image reading apparatus that reads an image from a document, and a server apparatus configured to communicate with the image reading apparatus, wherein the image reading apparatus includes a reading unit that reads an image from a document and a controller that controls the reading unit, and wherein the controller is configured to transmit, to a specified transmission destination, an e-mail with image data acquired by reading an image by the reading unit, and when a data size of the image data acquired by reading the image by the reading unit exceeds an upper limit data size, stores, in the server apparatus, at least part of the image data acquired by reading the image by the reading unit, and transmits, to a specified transmission destination, an e-mail indicating a storage destination when the image data is stored in the server apparatus. According to this image reading system, the same effect as that of the image reading apparatus can be obtained.

The image reading system includes an image reading apparatus that reads an image from a document, and a server apparatus configured to communicate with the image reading apparatus, wherein the image reading apparatus includes a reading unit that reads an image from a document and a controller that controls the reading unit, and wherein the controller is configured to store, in a server apparatus, at least part of image data acquired by reading an image by the reading unit, and transmits, to a specified transmission destination, an e-mail with the image data acquired by reading the image by the reading unit or the image data that is stored in the server apparatus when a data size of the image data acquired by reading the image by the reading unit does not exceed an upper limit data size, while transmits, to the specified transmission destination, an e-mail indicating a storage destination when the image data is stored in the server apparatus when the data size of the image data acquired by reading the image by the reading unit exceeds an upper limit data size. According to this image reading system, the same effect as that of the image reading apparatus can be obtained.

In the above image reading system, the controller may include a storage unit that temporarily stores data, with up to a predetermined data size, including at least image data acquired by reading an image by the reading unit, and in a case where when image data acquired by reading an image by the reading unit is stored in the storage unit, a data size of the image data stored in the storage unit exceeds a predetermined data size, may store the image data in the server apparatus, and may store, in the server apparatus, at least part of the image data stored in the storage unit after reading the image by the reading unit is completed, and wherein the server apparatus may combine image data transmitted from the image reading apparatus.

According to this configuration, in a case where when the image data acquired by reading the image from the document is temporarily stored in the storage unit, the data size of the image data stored in the storage unit exceeds the predetermined data size as an upper limit, the image data and the image data stored in the storage unit can be stored in the server apparatus, and can be combined in the server apparatus.

The image reading control method includes a first transmission step of being configured to transmit an e-mail with image data acquired by reading an image from a document to a specified transmission destination, a storage step of storing, in a server apparatus, at least part of the image data acquired by reading the image from the document when a data size of the image data acquired by reading the image from the document exceeds an upper limit data size, and a second transmission step of transmitting, to a specified transmission destination, an e-mail indicating a storage destination when the image data is stored in the server apparatus. According to this method, the effect same as that of the image reading apparatus can be obtained.

The image reading control method includes a storage step of being configured to store, in a server apparatus, at least part of image data acquired by reading an image from a document, a first transmission step of transmitting, to a specified transmission destination, an e-mail with the image data acquired by reading the image from the document or the image data that is stored in the server apparatus when a data size of the image data acquired by reading the image from the document does not exceed an upper limit data size, and a second transmission step of transmitting, the specified transmission destination, an e-mail indicating a storage destination when the image data is stored in the server apparatus when the data size of the image data acquired by reading the image from the document exceeds the upper limit data size. According to this method, the effect same as that of the image reading apparatus can be obtained.

In a non-transitory computer-readable storage medium storing a program, the program includes a first transmission step of being configured to transmit an e-mail with image data acquired by reading an image from a document to a specified transmission destination, a storage step of storing, in a server apparatus, at least part of the image data acquired by reading the image from the document when a data size of the image data acquired by reading the image from the document exceeds an upper limit data size, and a second transmission step of transmitting, to a specified transmission destination, an e-mail indicating a storage destination when the image data is stored in the server apparatus. According to this program, the effect same as that of the image reading apparatus can be obtained.

In a non-transitory computer-readable storage medium storing a program, the program includes a storage step of being configured to store, in a server apparatus, at least part of image data acquired by reading an image from a document, a first transmission step of transmitting, to a specified transmission destination, an e-mail with the image data acquired by reading the image from the document or the image data that is stored in the server apparatus when a data size of the image data acquired by reading the image from the document does not exceed an upper limit data size, and a second transmission step of transmitting, the specified transmission destination, an e-mail indicating a storage destination when the image data is stored in the server apparatus when the data size of the image data acquired by reading the image from the document exceeds the upper limit data size. According to this program, the effect same as that of the image reading apparatus can be obtained.

What is claimed is:

1. An image reading apparatus comprising:
   a reading unit that reads an image from a document; and
   a controller that controls the reading unit, wherein
   the controller is configured to
   when a data size of the image data acquired by reading the image by the reading unit does not exceed an upper limit data size, transmit, to a specified transmission destination, an e-mail with the image data acquired by reading an image by the reading unit attached thereto, and
   when the data size of the image data acquired by reading the image by the reading unit exceeds the upper limit data size, stores, in a server apparatus, at least part of the image data acquired by reading the image by the reading unit, and transmit, to a specified transmission destination, an e-mail with a storage destination, indicating where the image data is stored in the server apparatus, attached thereto.

2. The image reading apparatus according to claim 1, wherein the controller stores, in the server apparatus, the image data acquired by reading the image by the reading unit by using cloud computing through communicating with the server apparatus via a wide area communication network.

3. The image reading apparatus according to claim 1, further comprising:

a transport mechanism that transports a plurality of documents one by one in order, wherein the controller includes a determination unit that determines, after causing the reading unit to read images from all documents, whether a total data size of image data of all the documents acquired by reading the images by the reading unit exceeds an upper limit data size.

4. The image reading apparatus according to claim 1, further comprising:

a transport mechanism that transports a plurality of documents one by one in order, wherein when causing the reading unit to read images from the plurality of documents, the controller includes a determination unit that determines, every time an image is read from one document by the reading unit, whether a total data size of image data of all documents from an initial document to a current document acquired by reading images by the reading unit exceeds an upper limit data size.

5. The image reading apparatus according to claim 1, wherein the controller includes a storage unit that temporarily stores data, with up to a predetermined data size, including at least image data acquired by reading an image by the reading unit, and in a case where when image data acquired by reading an image by the reading unit is stored in the storage unit, a data size of the image data stored in the storage unit exceeds a predetermined data size, suspends reading of the image by the reading unit, stores, in the server apparatus, at least part of the image data stored in the storage unit, and deletes, from the storage unit, the image data which is stored in the server apparatus.

6. The image reading apparatus according to claim 1, wherein the controller includes a storage unit that temporarily stores data, with up to a predetermined data size, including at least image data acquired by reading an image by the reading unit, and in a case where when image data acquired by reading an image by the reading unit is stored in the storage unit, a data size of the image data stored in the storage unit exceeds a predetermined data size, stores the image data in the server apparatus.

7. The image reading apparatus according to claim 1, wherein the controller includes a storage unit that temporarily stores data, with up to a predetermined data size, including at least image data acquired by reading an image by the reading unit, and in a case where when image data acquired by reading an image by the reading unit is stored in the storage unit, a data size of the image data stored in the storage unit exceeds a predetermined data size, is configured to select, according to an input by a user, either to store, in the server apparatus, at least part of the image data acquired by reading the image by the reading unit, or to transmit, to a specified transmission destination, an e-mail with divided image data acquired by dividing the image data stored in the storage unit.

8. An image reading apparatus comprising:

a reading unit that reads an image from a document; and a controller that controls the reading unit, wherein the controller is configured to store, in a server apparatus, at least part of image data acquired by reading an image by the reading unit, and transmit, to a specified transmission destination, an e-mail with the image data acquired by reading the image by the reading unit or the image data that is stored in the server apparatus when a data size of the image data acquired by reading the image by the reading unit does not exceed an upper limit data size, and transmit, to the specified transmission destination, an e-mail with a storage destination, indicating where the image data is stored in the server apparatus when the data size of the image data acquired by reading the image by the reading unit exceeds an upper limit data size.

9. An image reading system comprising:

an image reading apparatus that reads an image from a document; and a server apparatus configured to communicate with the image reading apparatus, wherein the image reading apparatus includes a reading unit that reads an image from a document and a controller that controls the reading unit, and wherein the controller is configured to when a data size of the image data acquired by reading the image by the reading unit does not exceed an upper limit data size, transmit, to a specified transmission destination, an e-mail with the image data acquired by reading an image by the reading unit attached thereto, and when a data size of the image data acquired by reading the image by the reading unit exceeds an upper limit data size, store, in the server apparatus, at least part of the image data acquired by reading the image by the reading unit, and transmit, to a specified transmission destination, an e-mail with a storage destination, indicating where the image data is stored in the server apparatus, attached thereto.

10. The image reading system according to claim 9, wherein the controller includes a storage unit that temporarily stores data, with up to a predetermined data size, including at least image data acquired by reading an image by the reading unit, and in a case where when image data acquired by reading an image by the reading unit is stored in the storage unit, a data size of the image data stored in the storage unit exceeds a predetermined data size, stores the image data in the server apparatus, and stores, in the server apparatus, at least part of the image data stored in the storage unit after reading the image by the reading unit is completed, and wherein the server apparatus combines image data transmitted from the image reading apparatus.

11. An image reading system comprising:

an image reading apparatus that reads an image from a document; and a server apparatus configured to communicate with the image reading apparatus, wherein the image reading apparatus includes a reading unit that reads an image from a document and a controller that controls the reading unit, and wherein the controller is configured to store, in a server apparatus, at least part of image data acquired by reading an image by the reading unit, and transmit, to a specified transmission destination, an e-mail with the image data acquired by reading the image by the reading unit or the image data that is stored in the server apparatus when a data size of the image data acquired by reading the image by the reading unit does not exceed an upper limit data size, transmit, to the specified transmission destination, an e-mail with a storage destination, indicating where the image data is stored in the server apparatus, attached thereto, when the data size of the image data acquired by reading the image by the reading unit exceeds an upper limit data size.

12. An image reading control method comprising:

when a data size of image data acquired by reading an image by from a document does not exceed an upper limit data size, a first transmission step of being configured to transmit an e-mail with the image data acquired by reading the image from the document to a specified transmission destination attached thereto;

when the data size of the image data acquired by reading the image from the document exceeds the upper limit data size, a storage step of storing, in a server apparatus, at least part of the image data acquired by reading the image from the document; and a second transmission step of transmitting, to a specified transmission destination, an e-mail with a storage destination, indicating where the image data is stored in the server apparatus, attached thereto.

13. An image reading control method comprising:

a storage step of being configured to store, in a server apparatus, at least part of image data acquired by reading an image from a document;

a first transmission step of transmitting, to a specified transmission destination, an e-mail with the image data acquired by reading the image from the document or the image data that is stored in the server apparatus attached thereto, when a data size of the image data acquired by reading the image from the document does not exceed an upper limit data size; and a second transmission step of transmitting, the specified transmission destination, an e-mail with a storage destination, indicating where the image data is stored in the server apparatus, attached thereto, when the data size of the image data acquired by reading the image from the document exceeds the upper limit data size.

14. A non-transitory computer-readable storage medium storing a program, the program comprising:

when a data size of image data acquired by reading an image from a document does not exceed an upper limit data size, a first transmission step of being configured to transmit an e-mail with the image data acquired by reading the image from the document to a specified transmission destination attached thereto;

when the data size of the image data acquired by reading the image from the document exceeds the upper limit data size, a storage step of storing, in a server apparatus, at least part of the image data acquired by reading the image from the document; and a second transmission step of transmitting, to a specified transmission destination, an e-mail with a storage destination, indicating where the image data is stored in the server apparatus, attached thereto.

15. A non-transitory computer-readable storage medium storing a program, the program comprising:

a storage step of being configured to store, in a server apparatus, at least part of image data acquired by reading an image from a document;

a first transmission step of transmitting, to a specified transmission destination, an e-mail with the image data acquired by reading the image from the document or the image data that is stored in the server apparatus attached thereto, when a data size of the image data acquired by reading the image from the document does not exceed an upper limit data size; and a second transmission step of transmitting, the specified transmission destination, an e-mail with a storage destination, indicating where the image data is stored in the server apparatus attached thereto, when the data size of the image data acquired by reading the image from the document exceeds the upper limit data size.

* * * * *